(12) United States Patent
Liu

(10) Patent No.: US 12,189,199 B2
(45) Date of Patent: Jan. 7, 2025

(54) OPTICAL CONNECTOR AND OPTICAL CONNECTOR MODULE AND OPERATION METHOD USING THE SAME

(71) Applicant: Mei-Miao Liu, Taipei (TW)

(72) Inventor: Mei-Miao Liu, Taipei (TW)

(73) Assignee: Mei-Miao Liu, Taipei (TW)

( * ) Notice: Subject to any disclaimer, the term of this patent is extended or adjusted under 35 U.S.C. 154(b) by 7 days.

(21) Appl. No.: 17/100,882

(22) Filed: Nov. 22, 2020

(65) Prior Publication Data
US 2021/0263245 A1 Aug. 26, 2021

Related U.S. Application Data

(60) Provisional application No. 63/075,322, filed on Sep. 8, 2020, provisional application No. 62/979,435, filed on Feb. 21, 2020.

(51) Int. Cl.
*G02B 6/38* (2006.01)
*G02B 6/42* (2006.01)

(52) U.S. Cl.
CPC ......... *G02B 6/4261* (2013.01); *G02B 6/3825* (2013.01); *G02B 6/3893* (2013.01); *G02B 6/3897* (2013.01); *G02B 6/4246* (2013.01)

(58) Field of Classification Search
CPC .............. G02B 6/38; G02B 6/42; G02B 6/00
USPC .......................................................... 385/92
See application file for complete search history.

(56) References Cited

U.S. PATENT DOCUMENTS

| | | | | |
|---|---|---|---|---|
| 5,101,463 A | * | 3/1992 | Cubukciyan | G02B 6/389 385/71 |
| 6,045,270 A | * | 4/2000 | Weiss | G02B 6/3825 385/59 |
| 9,726,831 B2 | * | 8/2017 | Gniadek | G02B 6/3821 |
| 9,897,766 B2 | * | 2/2018 | Gniadek | G02B 6/3821 |
| 11,175,466 B2 | * | 11/2021 | Gniadek | G02B 6/3821 |
| 11,747,572 B2 | * | 9/2023 | Wong | G02B 6/3851 385/71 |
| 2003/0236019 A1 | * | 12/2003 | Hanley | G02B 6/4292 439/372 |
| 2012/0021627 A1 | * | 1/2012 | Wang | H01R 13/6335 439/159 |
| 2016/0327757 A1 | * | 11/2016 | Lee | G02B 6/3869 |
| 2016/0336685 A1 | * | 11/2016 | Phillips | H01R 13/6275 |
| 2017/0090126 A1 | * | 3/2017 | Lu | G02B 6/3821 |
| 2018/0088288 A1 | * | 3/2018 | Taira | G02B 6/3885 |
| 2020/0174198 A1 | * | 6/2020 | Ott | G02B 6/3825 |

(Continued)

*Primary Examiner* — Kaveh C Kianni

(57) ABSTRACT

The present invention provides an optical connector coupled to an optical receptacle, wherein the optical connector comprises an outer housing, a coupling module, and a latch structure. The coupling module is disposed in the outer housing for slidably connecting to the outer housing. When the latch structure is operated at a first position, the optical connector is unable to be taken away from the optical receptacle, and when the latch structure is operated at a second position, the outer housing is allowed to slide relative to the coupling module whereby the optical connector is taken away from the optical receptacle. In another embodiment, the present invention further provides an optical module and an operation method in which a movement for changing the position of the latch structure is operated to lock the optical connector into the optical receptacle or take the optical connector away from the optical receptacle.

25 Claims, 26 Drawing Sheets

(56) References Cited

U.S. PATENT DOCUMENTS

2020/0310041 A1* 10/2020 Chang ................ G02B 6/3893
2020/0333537 A1* 10/2020 Gniadek .............. G02B 6/3893

* cited by examiner

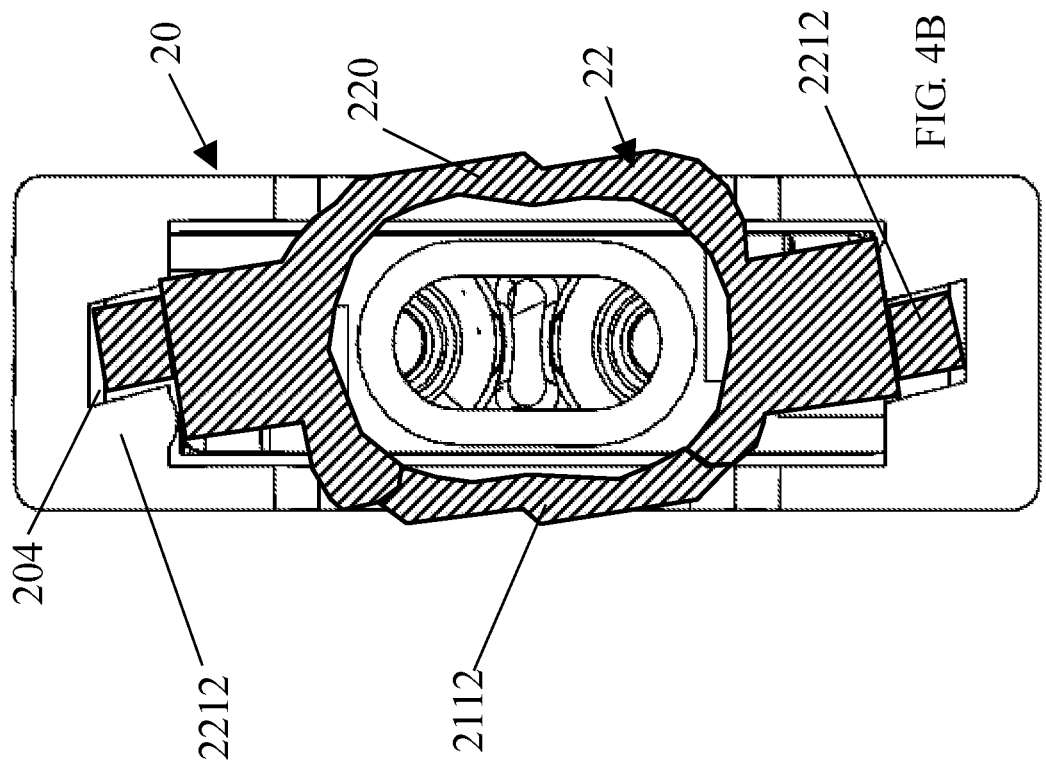
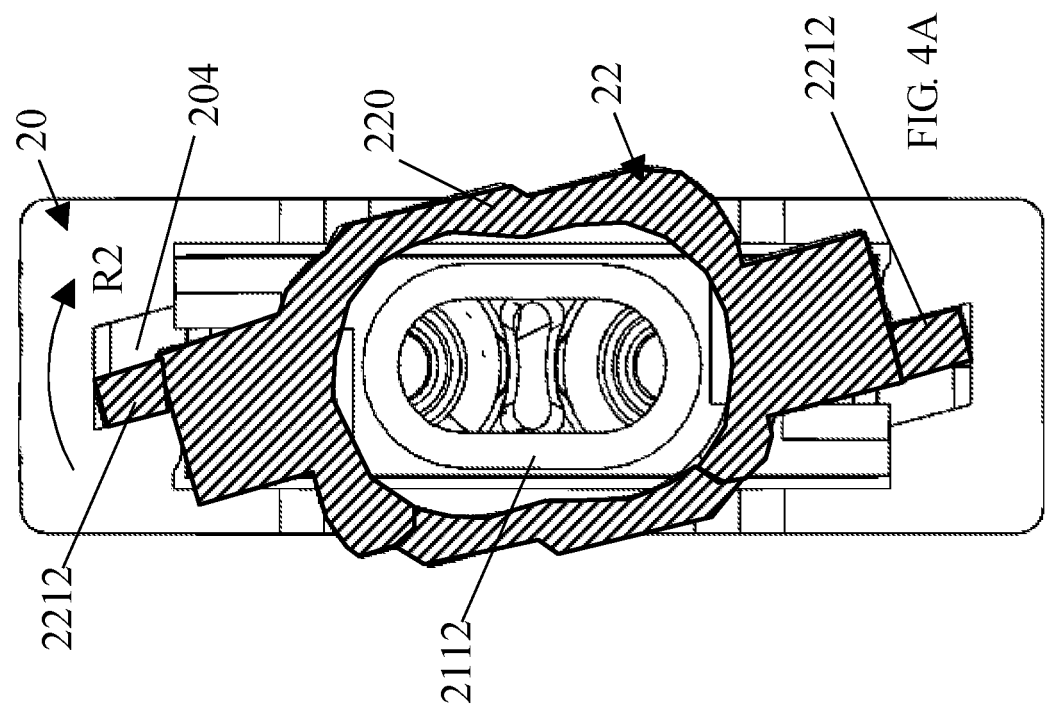
FIG. 4A
FIG. 4B

OPTICAL CONNECTOR AND OPTICAL CONNECTOR MODULE AND OPERATION METHOD USING THE SAME

CROSS-REFERENCE TO RELATED APPLICATION

This application claims the benefit of each of the following U.S. Provisional Patent Applications, each of which is incorporated herein by reference in its entirety: U.S. Provisional Patent Application No. 62/979,435 filed on Feb. 21, 2020 and U.S. Provisional Patent Application No. 63/075,322 filed on Sep. 8, 2020.

FIELD OF INVENTION

The present invention relates to an optical connector, in particular to an optical connector that is locked in or taken away from an optical receptacle as well as an optical connector module and operation method using the same.

BACKGROUND OF THE INVENTION

Due to the advantages of high frequency bandwidth and low loss, optical fibers have been widely used as signal transmission media in recent years. The use of optical fiber has already had a major revolutionary impact in the communications industry. Nowadays, 100G optical module communication is not enough, and the future will be expected to move towards the era of 400G optical module communications.

In the field of 400G optical communications, there are also many designs for the packaging design of optical fiber modules, one of which is called Quad Small Form Factor Pluggable-Double Density (QSFF-DD). The specification, with a downward compatible design, has attracted the attention of many large manufacturers, and has launched corresponding specifications of optical communication module products.

In the optical module, in addition to the structure of the receptacle, the design of the optical connector is also very important. There are many types of optical connectors, and different manufacturers have different designs, such as SN connectors, MDC connectors, or LC connectors. When the connector is to be connected to the receptacle, sometimes the polarity of the connection needs to be changed to adapt to different situations.

However, in the conventional technology, although the optical connector can be coupled to the optical receptacle, how to ensure that the optical connector can be firmly coupled to the optical receptacle without being taken away from the optical receptacle by an external force accidently. It is a problem to be solved in this technical field.

The above information disclosed in this section is only for enhancement of understanding of the background of the described technology and therefore it may contain information that does not form the prior art that is already known to a person of ordinary skill in the art.

SUMMARY OF THE INVENTION

The present invention provides an optical connector with a latch structure that can be positioned at different positions, and the unlocking or locking state of the optical connector and the optical receptacle can be changed according to the position of the latch structure. The advantage of the present invention is to prevent the optical connector from falling off due to an external force or the user's carelessness, and achieve the effect of fixing the optical connector.

The present invention provides an optical connector module. When the optical connector is inserted into the optical receptacle, the latch structure disposed on the optical connector is used to prevent the optical connector from being accidentally pulled out due to an external force. When the latch structure slides to the first position, the optical connector cannot be pulled out from the optical receptacle, and when the latch structure slides to the second position, the optical connector can be taken away from the optical receptacle. The position of the latch structure is changed to stabilize the coupling relationship between the optical connector and the optical receptacle.

In one embodiment, the present invention provides an optical connector for coupling to an optical receptacle, comprising: an outer housing; a coupling module, disposed in the outer housing and slidably connected to the outer housing; and a latch structure, wherein when the latch structure is located at a first position, the optical connector is not able to be taken away from the optical receptacle; and when the latch structure is located at a second position, the outer housing is slid relative to the coupling module whereby the optical connector is taken away from the optical receptacle.

In another embodiment, the present invention provides an optical connector module, comprising: an optical receptacle, having a claw member; an optical connector, coupled to the optical receptacle, and buckled with the claw member, the optical connector including an outer housing, a coupling module, and a latch structure, a unbuckle portion of the outer housing located in the claw member, the coupling module disposed in and slidably connected to the outer housing, and the claw member buckled on the coupling module, wherein when the latch structure is located at a first position, the outer housing and the optical module are moved together, so that the optical connector is unable to take away from the optical receptacle; and when the latch structure is located at a second position, the outer housing is moved relative to the coupling module by an external force, so that a unbuckle portion of the outer housing moves with the external force, thereby releasing the claw member from the coupling module and making the optical connector taken away from the optical receptacle.

Moreover, the present invention also provides an operation method of an optical connector module, comprising: providing an optical connector, including an outer housing, a coupling module, and a latch structure; inserting an optical connector into an optical receptacle to make a claw member, which is disposed in the optical receptacle, buckle with the coupling module of the optical connector; moving the latch structure to a first position by a first displacement movement to make the optical connector not taken away from the optical receptacle; and moving the latch structure to a second position by a second displacement movement, sliding the outer housing relative to the coupling module under an external force to make a unbuckle portion of the outer housing move with the external force, thereby releasing the claw member from the coupling module and taking the optical connector away from the optical receptacle.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

FIGS. 4A and 4B are schematic diagrams of the optical connector in the state of FIG. 3A, approximately at the position AA of the YZ cross-section in the present invention.

DETAILED DESCRIPTION OF THE PREFERRED EMBODIMENTS

Figure 1A:
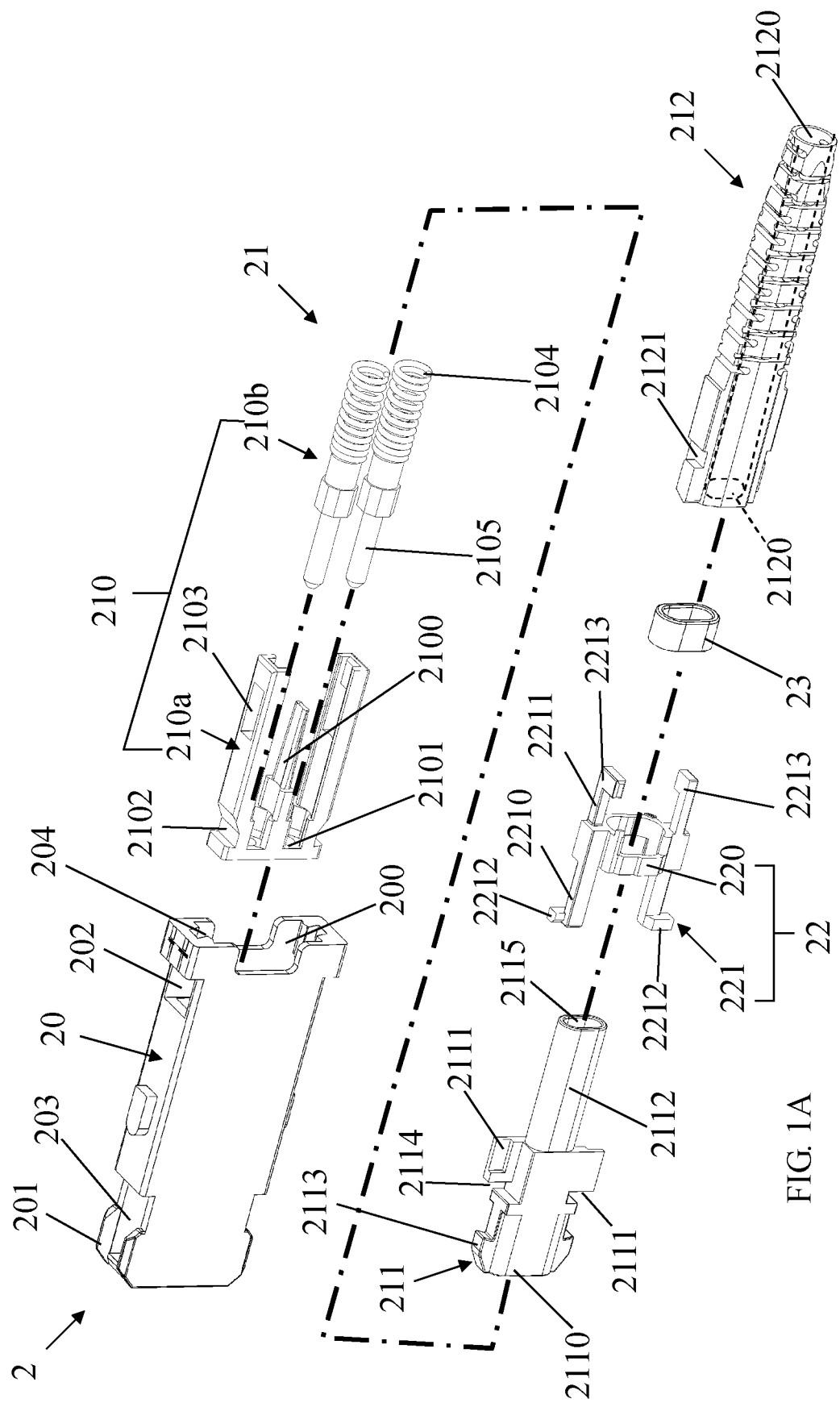
FIG. 1A is a three-dimensional exploded schematic diagram of the optical connector in the present invention.

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate an optical connector, an optical connector module and operation method using the same and to aid it of skilled in the art in practicing this invention. These embodiments are merely exemplary embodiments and in no way to be considered to limit the scope of the invention in any manner.

Figure 1B:
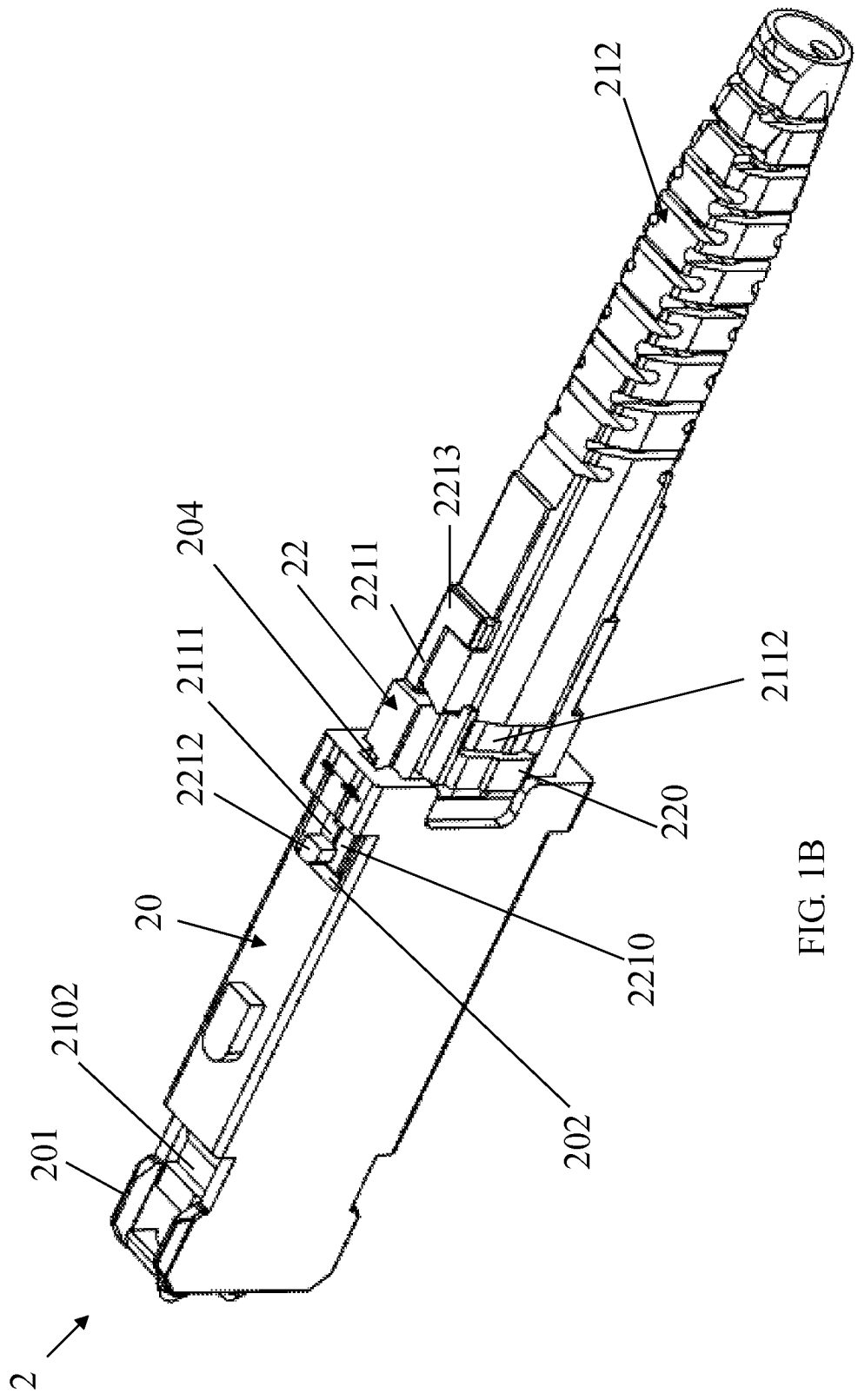
FIG. 1B is a schematic diagram of the optical connector assembly in the present invention.

Please refer to FIGS. 1A and 1B, FIG. 1A is a three-dimensional exploded schematic diagram of the optical connector in the present invention, and FIG. 1B is a schematic diagram of the optical connector assembly in the present invention. In this embodiment, the optical connector 2 is an SN optical connector, but it is not limited thereto. The optical connector 2 is used to insert into the optical receptacle, and includes an outer housing 20, a coupling module 21 and a latch structure 22. In this embodiment, an insertion hole 200 is disposed on one side of the outer housing 20 for inserting the coupling module 21 into the outer housing 20. The outer housing 20 further has a unbuckle portion 201 disposed on the upper side of one end of the outer housing 20, and its application would be described later. The outer housing 20 further has first buckle grooves 202 on the upper and lower sides of the insertion hole 200 for buckling with the coupling module 21.

The coupling module 21 is disposed in the outer housing 20 and slidably connected to the outer housing 20. In this embodiment, the coupling module 21 further has a terminal module 210, a guiding structure 211, and a boot structure 212. The terminal module 210 is slidably connected to the outer housing 20 for coupling with a base (not shown) of the optical connector. In this embodiment, the terminal module 210 further has a terminal base 210a and a pair of terminal portions 210b. In this embodiment, the terminal base 210a is slidably disposed in the outer housing 20, and a partition plate 2100 is disposed at the center of the terminal base 210a to divide the terminal base 210a into two regions to respectively accommodate the terminal portions 210b. At the front end of the terminal base 210a, the two sides of the partition plate 2100 respectively have through holes 2101, and the upper and lower sides of the through holes 2101 respectively have buckle portions 2102. The upper and lower sides of the end of the partition plate 2100 have second buckle grooves 2103 respectively. The buckle portions 2102 are respectively exposed from the openings 203 on the upper and lower sides of the outer housing 20, and their functions would be described later. The terminal portion 210b further has a terminal 2105 and an elastic element 2104, wherein the terminal 2105 passes through the through hole 2101 at the front end of the terminal base 210a. One end of the elastic element 2104 is leaned against the end of the terminal 2105, and another end of the elastic element 2104 is leaned against the front end surface 2110 of the guiding structure 211. The elastic element 2104 is used to provide an elastic force to the terminal 2105 for adjusting the position of the terminal 2105. In addition, there are escape grooves 204 at the upper and lower ends of the insertion hole 200 of the outer housing 20, the function of escape grooves would be described later.

The guiding structure 211 is connected to the terminal module 210. In this embodiment, the guiding structure 211 further has a first positioning structure 2111 formed on the upper and lower sides of the guiding structure 211, respectively. When the coupling module 21 is installed on the outer housing 20, the positioning structure 2111 is combined with the first buckle groove 202 to generate a positioning effect. In this embodiment, the first positioning structure 2111 has an embedding space 2114 on the side of the front end surface 2110 for embedding the first fastener 2212 of the latch structure 22, and its operation method would be described later. At the end of the guiding structure 211, an extending shaft 2112, on which the latch structure 22 is sleeved, is protruded, and the extending shaft 2112 further penetrates into the second wire through hole 2120 of the boot structure 212. In this embodiment, the extending shaft 2112 has a first wire through hole 2115, which allows a communication wire (not shown) coupled with the terminal 2105 to pass through. The upper and lower sides of the front end surface 2110 of the guiding structure 211 further have second positioning structures 2113 for combining with the second buckle groove 2103 during assembly, so that the guiding structure 211 can be combined with the terminal base 210a. The boot structure 212 is rotatably combined with the extending shaft 2112 through the second wire through hole 2120, so that the latch structure 22 is pressed and fixed on the extending shaft 2112 by the boot structure 212. In this embodiment, a shaft sleeve 23 is further disposed between the boot structure 212 and the extending shaft 2112 to reduce the resistance between the boot structure 212 and the extending shaft 2112. It should be noted that the shaft sleeve 23 is not a necessary component in the present invention, and the user is able to decide depending on the needs.

In this embodiment, the latch structure 22 has a connecting member 220, and two sides of the latch structure 22 respectively have a fastening portion 221. Each fastening portion 221 further has a first extending rod 2210 and a second extending rod 2211. One end of the first extending rod 2210 has a first fastener 2212, and one end of the second extending rod 2211 has a second fastener 2213. The second extending rod 2211 extends to the boot structure 212 so that the second fastener 2213 is combined with the coupling structure 2121 on one side of the boot structure 212. In this embodiment, the coupling structure 2121 is a trough structure, so that the second fastener 2213 can be embedded into it to generate a coupling effect.

Since the boot structure 212 can be rotatably combined with the extending shaft 2112, and the latch structure 22 can also be rotatably sleeved on the extending shaft 2112, and can be combined with the boot structure 212 through the second fastener 2213. The boot structure 212 takes the extending shaft 2112 as a rotation axis, and rotates on the extending shaft 2112 to change the position of the latch structure 22. The latch structure 22 in this embodiment has three functions. The first function is to lock the optical connector in the optical receptacle. In this state, the optical connector cannot be pulled out by the external force, and can be avoided to take away from the optical receptacle. The second function is to release the locking relationship between the optical connector and the optical receptacle, so that the optical connector can be unplugged from the optical receptacle. The third function is to change the polarity of the coupling module of the optical connector.

Figure 2A:
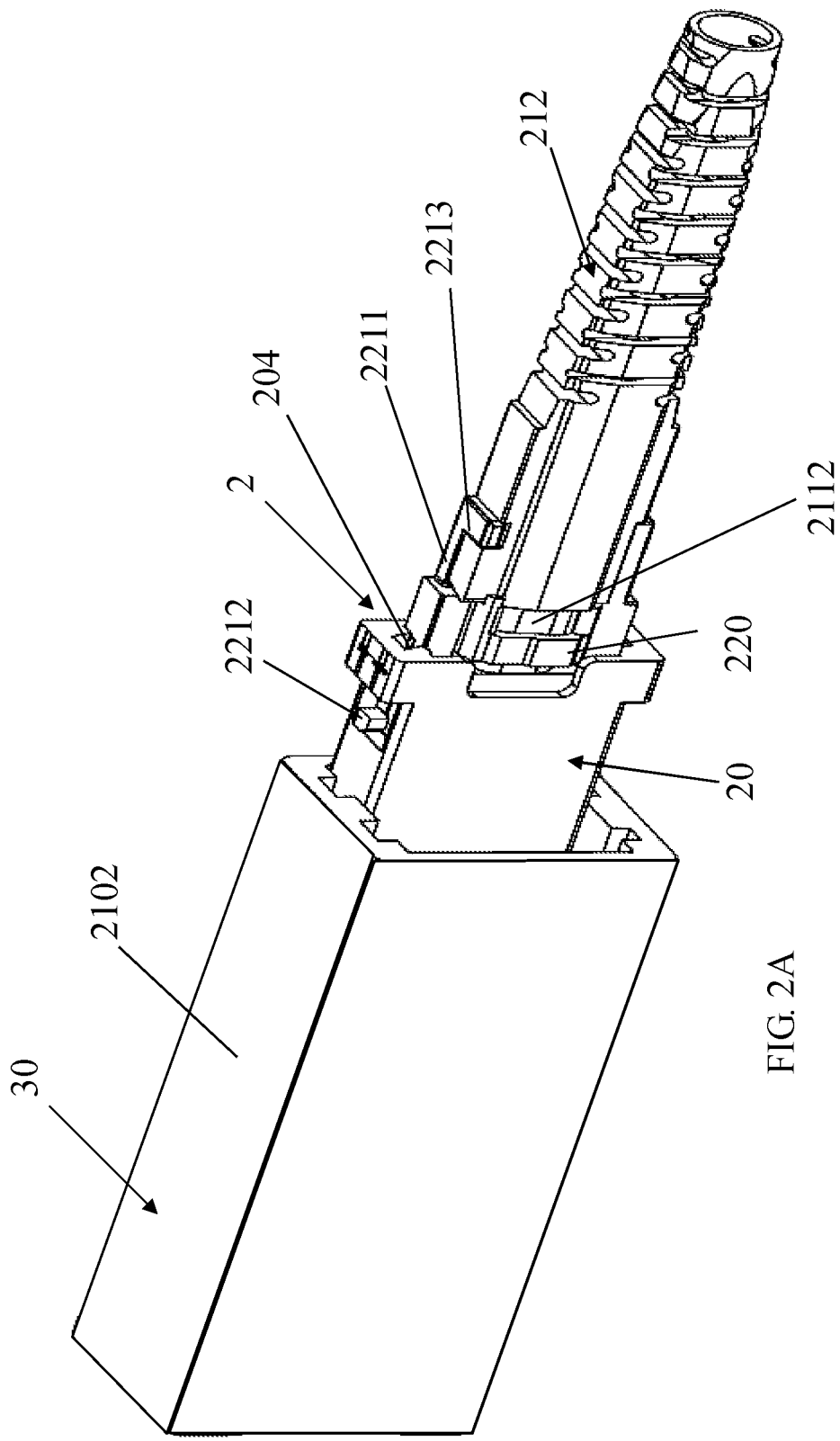
FIG. 2A is a schematic diagram of the three-dimensional assembly of the optical connector module in the present invention.
Figure 2B:
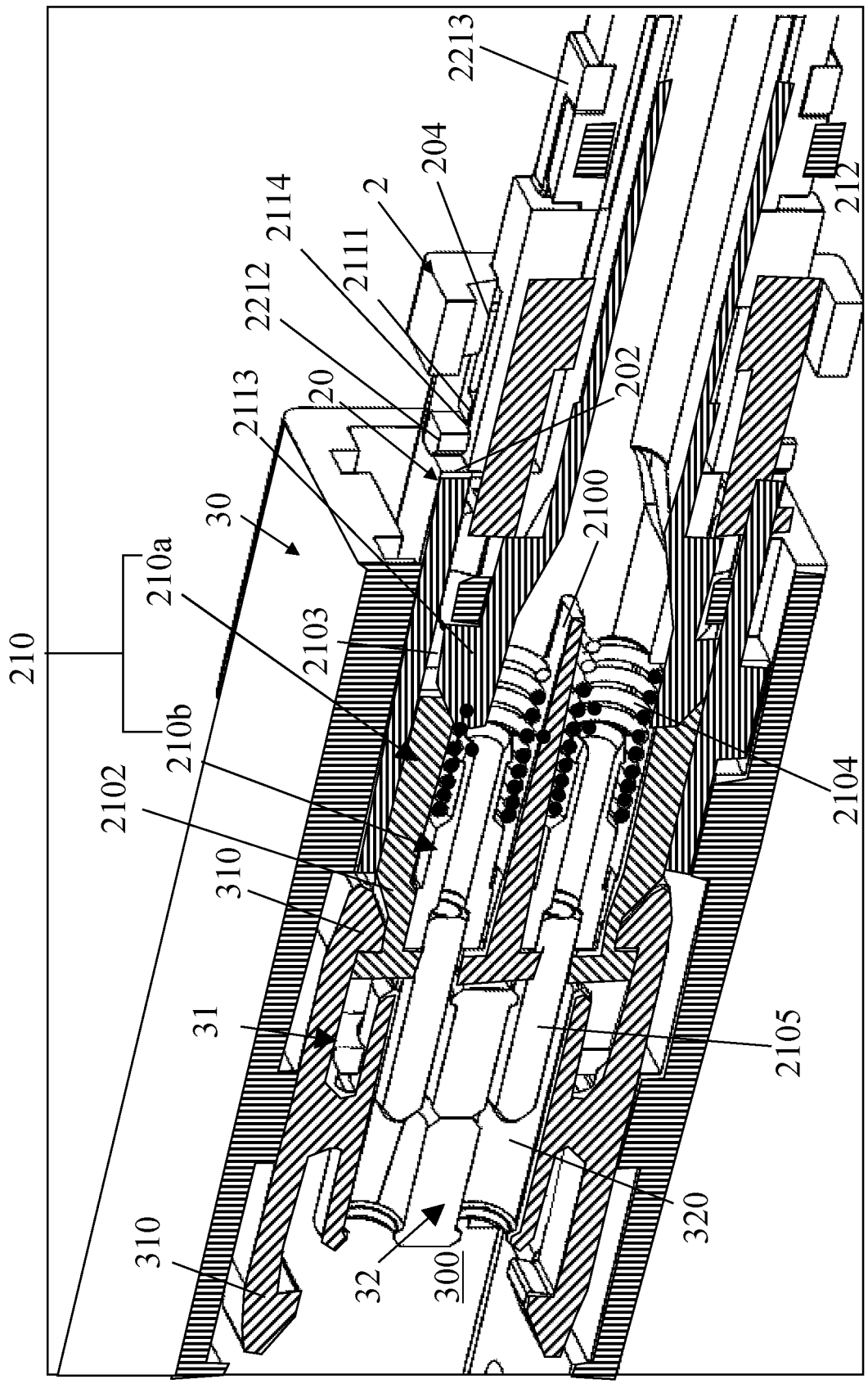
FIG. 2B is a schematic cross-sectional diagram of the optical connector module in the present invention.

Next, how to achieve the above three effects is going to be explained. Please refer to FIGS. 2A and 2B, where FIG. 2A is a schematic diagram of the three-dimensional assembly of the optical connector module in the present invention, and FIG. 2B is a schematic cross-sectional diagram of the optical connector module in the present invention. In this embodiment, the optical connector module 3 includes an optical receptacle 30 and an optical connector 2. The optical receptacle 30 has an accommodating space 300, and a claw portion 31 and an electrical connection base 32 are accommodated inside the accommodating space 300. In this embodiment, one end of the electrical connection base 32 is electrically connected to the optical connector 2, wherein the electrical connection base 32 has an electrical connection through hole 320, which is allowed the terminal 2105 of the optical connector 2 to pass through. The claw portions 31 are respectively arranged on both sides of the electrical connection base 32, and both ends of the claw portions 31 are respectively have claw members 310. When the optical connector 2 is inserted into the optical receptacle 30. The claw members 310 are buckled with the buckle portion 2102 on the terminal base 210a of the terminal module 210 of the optical connector 2.

Figure 2D:
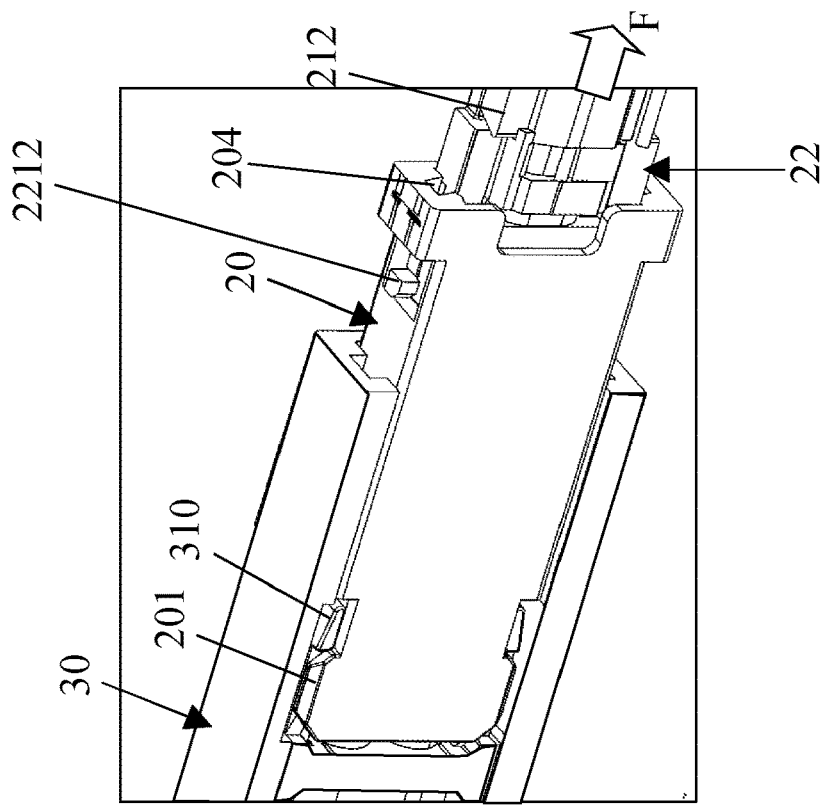
FIG. 2D is a schematic diagram of the optical connector having the outer housing.
Figure 2C:
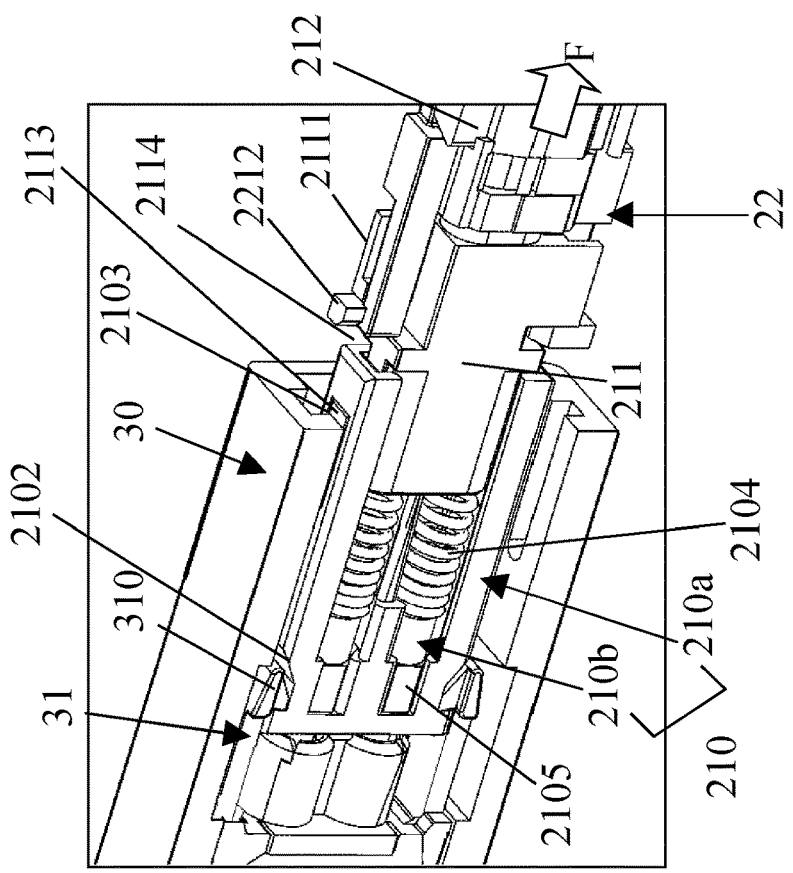
FIG. 2C is a schematic diagram of the optical connector with removing the outer housing.

After the optical connector 2 is inserted into the optical receptacle 30, the boot structure 212 is rotated so that the latch structure 22 is located at the first position, that is, the first fastener 2212 of the latch structure 22 is embedded into the embedding space 2114 to make the optical connector 2 firmly locked in the optical receptacle 30 and cannot be pulled out by the external force. The following describes the locking mechanism, please refer to FIGS. 2C and 2D, which are partial cross-sectional schematic diagrams when the optical connector 2 is combined with the optical receptacle 30, wherein FIG. 2C is a schematic diagram of the optical connector with removing the outer housing, and FIG. 2D is a schematic diagram of the optical connector having the outer housing. Since the boot structure 212 is combined with the terminal module 210 by the latch structure 22, when the boot structure 212 is pulled by the external force F, the external force F is delivered to the terminal module 210 through the latch structure 22.

In this embodiment, the first fastener 2212 of the latch structure 22 is embedded into the embedding space 2114 at the front end of the first positioning structure 2111. Therefore, when the external force F is delivered to the latch structure 22, the first fastener 2212 of the latch structure 22 is leaned against the first positioning structure 2111, so that the external force is delivered to the guiding structure 211 having the first positioning structure 2111. Moreover, the guiding structure 211 is embedded into the second buckle groove 2103 by the second positioning structure 2113, so the external force is delivered to the terminal base 210a having the second buckle groove 2103. Also, since the buckle portion 2102 at the front end of the terminal base 210a is locked by the claw member 310, the optical connector 2 cannot be pulled out from the optical receptacle 30 even if the external force F is applied. In addition, it should be noted that, in the aforementioned state of FIG. 2C and FIG. 2D, although the outer housing 20 of the optical connector 2 has a unbuckle portion 201, when it is pulled by the external force F, the latch structure 22 is embedded into the embedding space 2114 of the first position, so that the external force F is not able to deliver the force to the outer housing 20. As a result, the outer housing 20 cannot be affected by the external force F and cannot generate a displacement movement to release the claw member 310. Therefore, when the first fastener 2212 of the latch structure 22 is leaned against the first positioning structure 2111, a fixing effect of locking the optical connector 2 in the optical receptacle 30 can be generated.

Figure 3A:
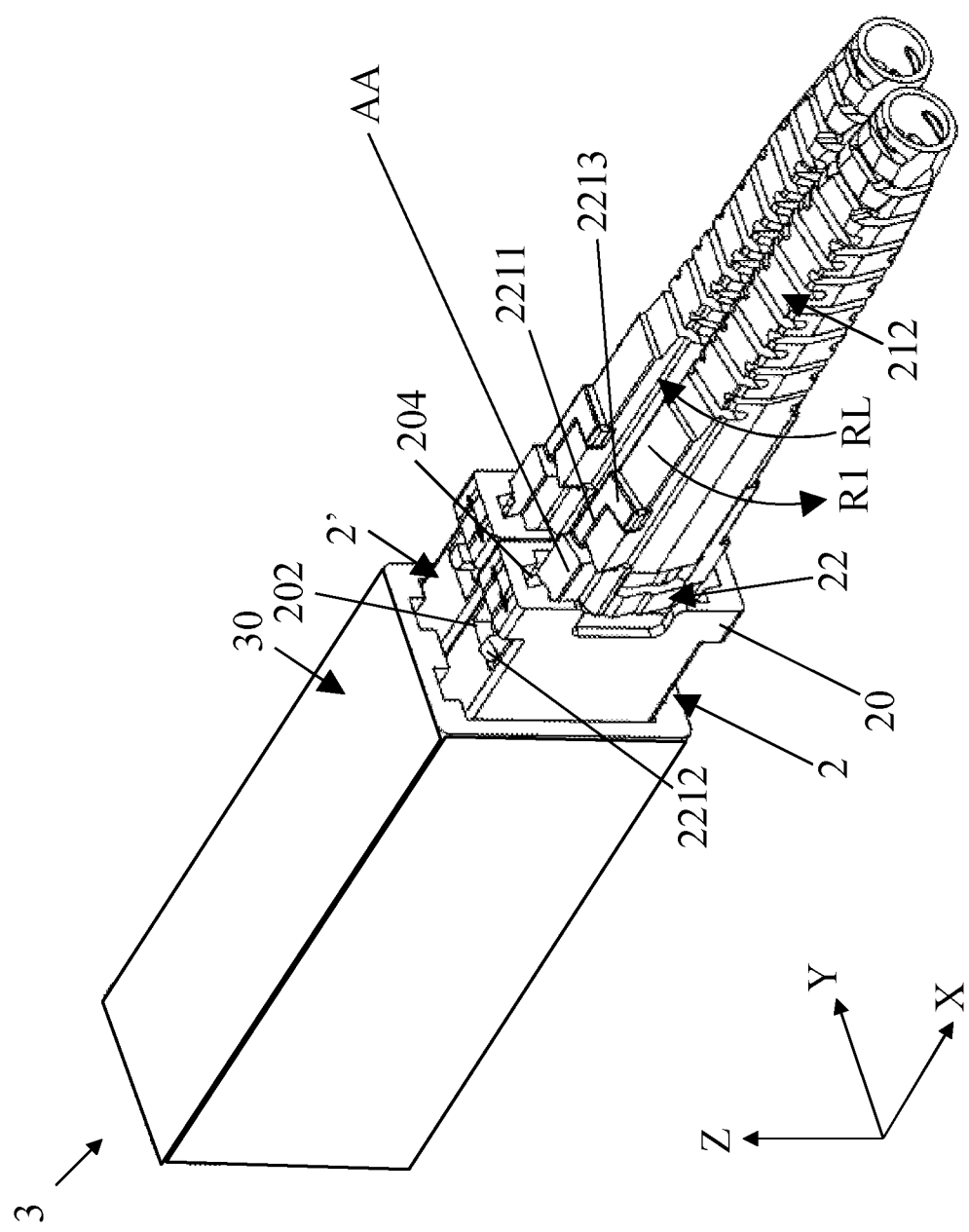
FIGS. 3A to 3C are schematic diagrams of the optical connector in a unlocked state in the present invention.
Figure 3B:
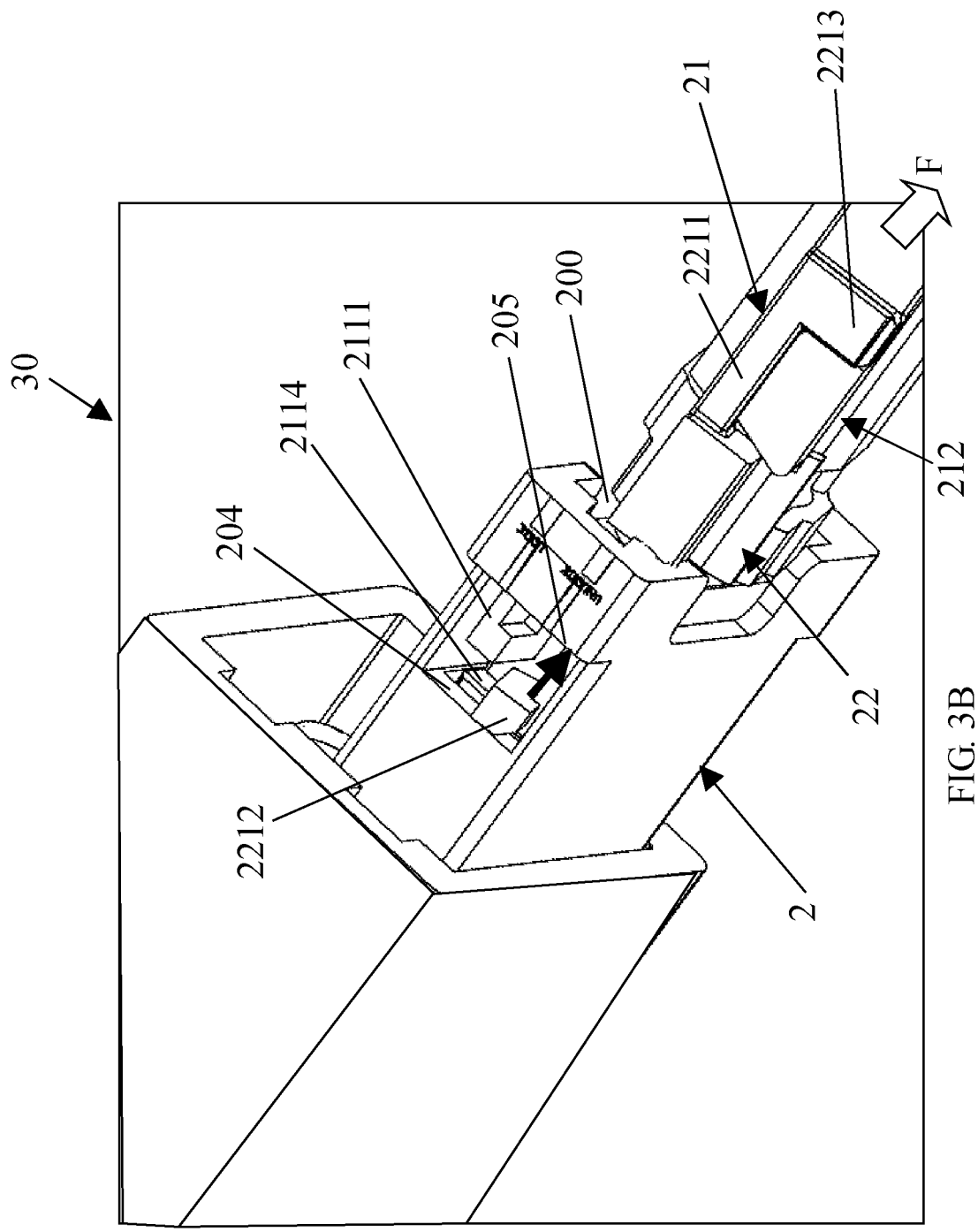
Figure 3C:
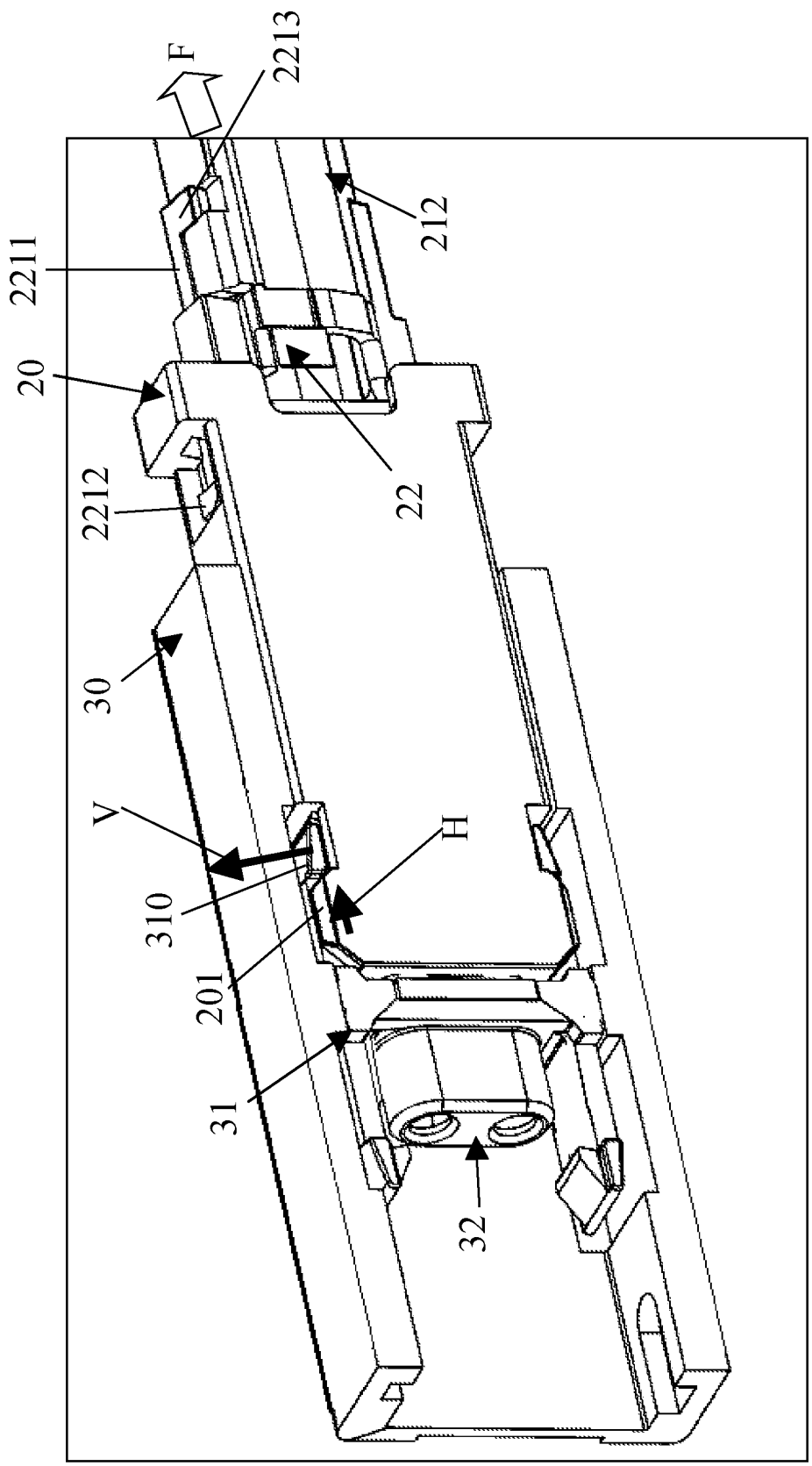

Please refer to FIGS. 3A to 3C, which are schematic diagrams of the optical connector in the present invention in an unlocked state. In FIG. 3A, the optical connector 30 has two optical connectors 2 and 2', wherein the optical connector 2' is in the locked state, and the optical connector 2 is in the unlocked state. The optical connectors 2 and 2' are used to compare with each other. When the user needs to unplug the optical connector 2 from the optical receptacle 30, as shown in FIG. 3A, the user may perform the optical connector 2 in a first displacement movement R1 by a predetermined angle, so that the first fastener 2212 is separated from the embedded space 2114 to move to the second position, the rotation movement of this embodiment is that the user uses the boot structure 212 to rotate counterclockwise. As shown in FIG. 3B, it can be clearly seen that the first fastener 2212 is separated from the embedding space 2114. In this state, if the user applies an external force F, which direction is opposite to the insertion direction of the optical connector 2 into the optical receptacle 30, to the boot structure 212, then the external force F is delivered to the latch structure 22 through the boot structure 212. Since the latch structure 22 is no longer restrained by the first positioning structure 2111, the boot structure 212 is also not restrained by the first positioning structure 2111. Therefore, after receiving the external force F, the coupling module 21 moves in the direction of the external force F. At this time, when the latch structure 22 moves in the direction of the external force F along with the boot structure 212, the first fastener 2112 also moves, and is leaned against the abutment surface 205 on the side of the insertion hole 200 of the outer housing 20.

After the first fastener 2112 is leaned against the abutment surface 205, as the external force F continues to pull, the first fastener 2112 delivers the external force F to the outer housing 20. When the outer housing 20 receives the external force F, the outer housing 20 is also pulled in the direction of the external force F. Since the outer housing 20 is not restrained by the claw portion 31, when the outer housing 20 moves in the direction of the external force F, the unbuckle portion 201 on the outer housing 20 would also move a predetermined distance H along the direction of the external force F. When the unbuckle portion 201 is moved in a predetermined distance H, the claw portion 31 would be propped up in the direction V, and the claw portion 31 would be separated from the buckle portion 2102.

Figure 3D:
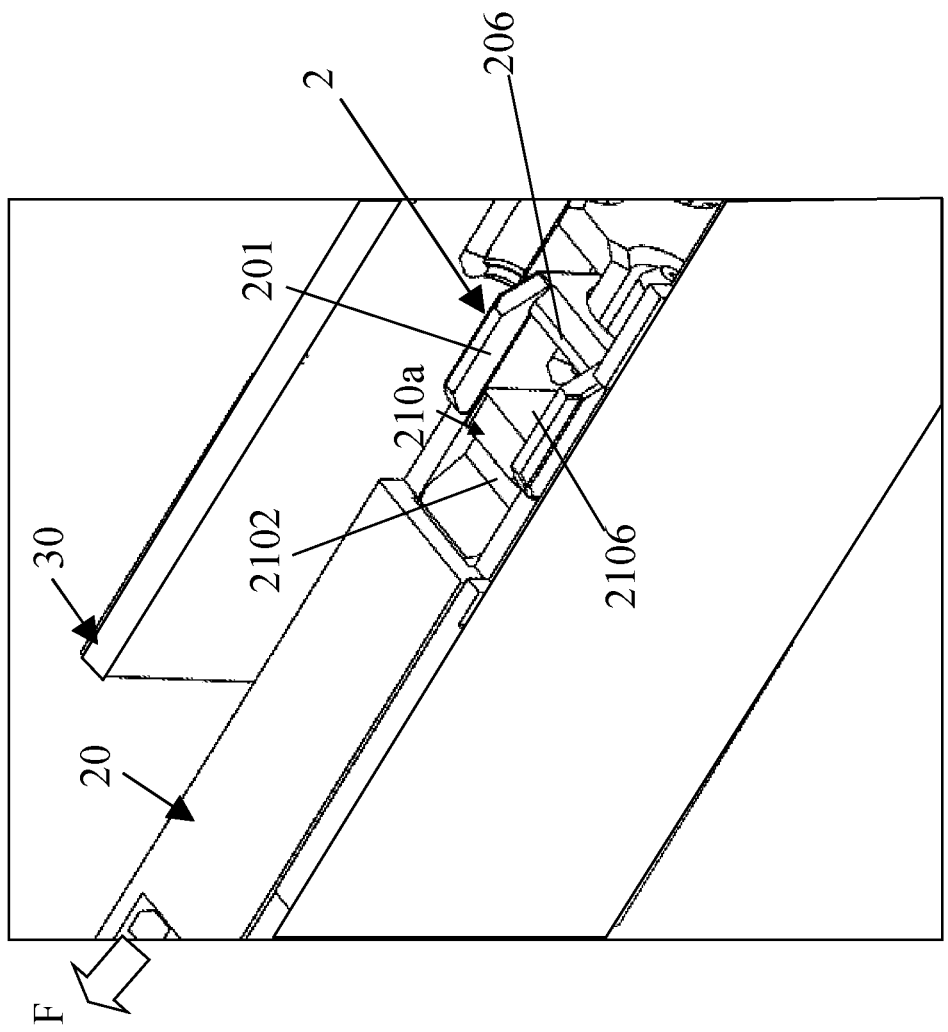
FIG. 3D is a schematic diagram of an embodiment of the optical connector taking away from the optical receptacle in the present invention.

Please refer to FIG. 3D, which is a schematic diagram of an embodiment of the optical connector taking away from the optical receptacle in the present invention. This embodiment mainly explains how to take the optical connector 2 away from the optical receptacle 30 after the outer housing 20 moves in the direction of the external force F. In this embodiment, after the outer housing 20 of the optical connector 2 is moved by the external force F, the end portion 206 of the outer housing 20 would be leaned against the surface 2106 of the terminal base 210a after moving a certain distance. As the external force F continues to be applied, the outer housing 20 pushes the terminal base 210a to move in the direction of the external force F, and the entire optical connector 2 is separated from the optical receptacle 30.

Figure 5A:
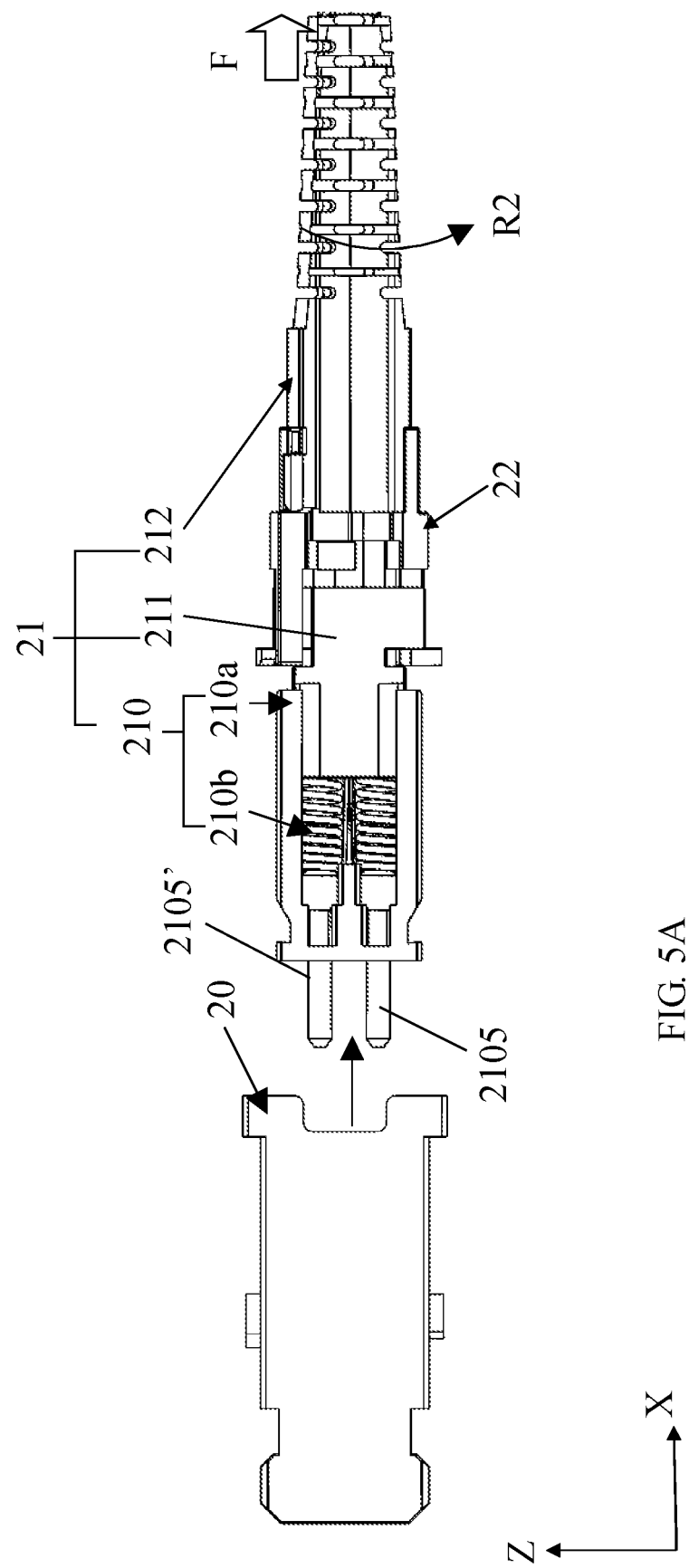
FIGS. 5A and 5B are schematic diagrams showing the polarity change of the optical connector in the present invention.

Next, the way of changing the polarity of the optical connector is going to be explained. In this embodiment, as shown in FIGS. 4A and 4B, which are YZ cross-sectional schematic diagram of the optical connector 2 in the state of FIG. 3A, approximately at the position AA. In the state of FIG. 4A, the latch structure 22 is rotated to the second position. It should be noted that when the latch structure 22 is rotated to the second position and the optical connector 2 is pulled out from the optical receptacle 30, the first fasteners 2212 at both ends of the latch structure 22 is leaned against the outer housing 20, but it does not completely correspond to the escape groove 204, so that the user can pull the optical connector 2 out of the optical receptacle in this state. When the user wants to change the polarity, as shown in FIG. 4A, the latch structure 22 can be rotated clockwise to the third position. In the third position, the first fastener 2212 completely corresponds to the escape groove 204. In this state, as shown in FIGS. 4B and 5A, the user applies a pulling force F in the X direction to the boot structure 212. The boot structure 212 receives the pulling force F and delivers the force to the latch structure 22. Since the first fastener 2212 on the latch structure 22 corresponds to the escape groove 204 of the outer housing 20, after the external force F is driven, the latch structure 22 moves along the X direction and is separated from the outer housing 20.

Figure 5B:
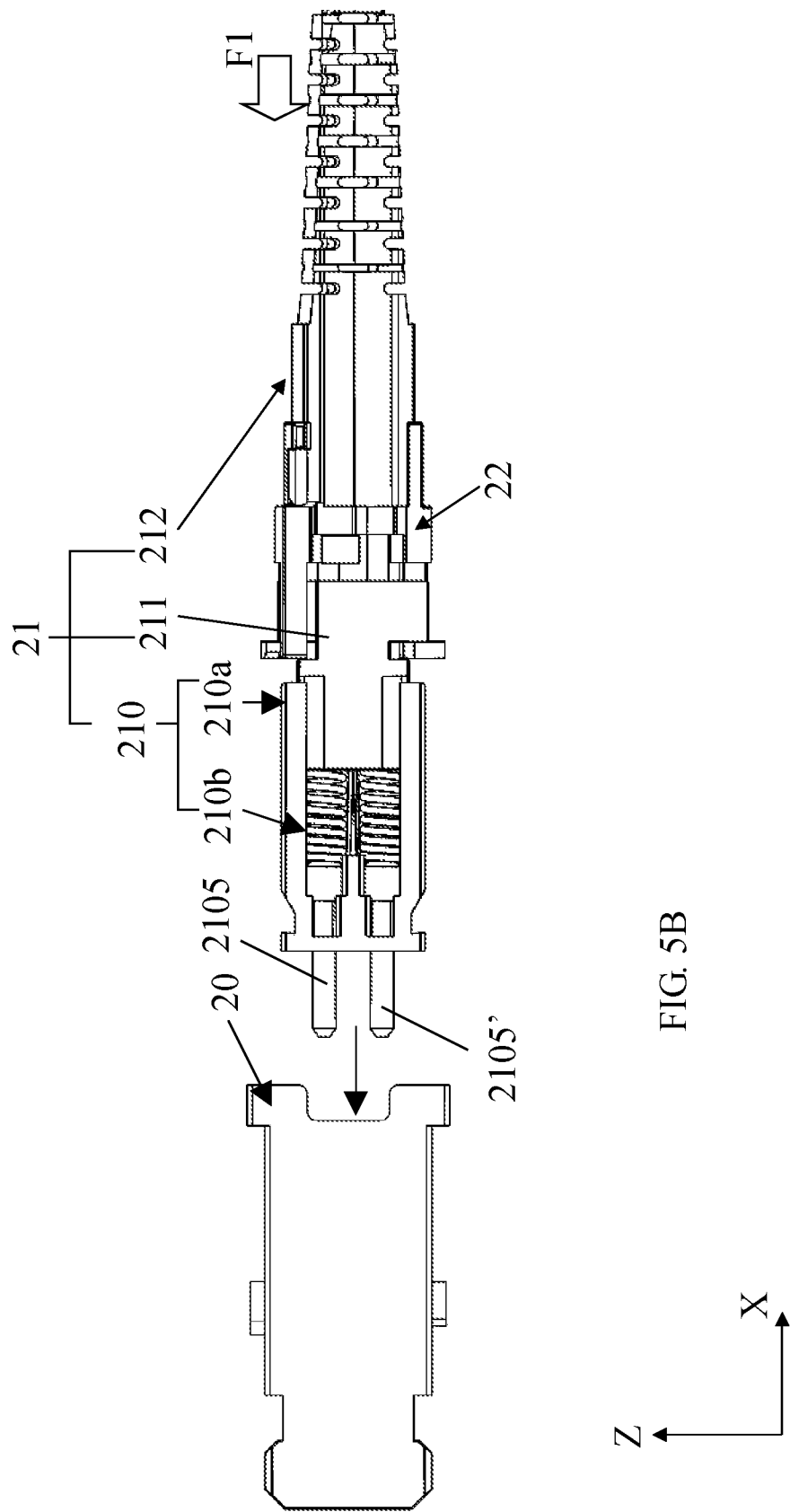

After separating from the outer housing 20, taking FIG. 5A as an example, the terminal 2105 is below and the terminal 2105' is above. When changing the polarity, the terminal module 21 is flipped completely, as shown in FIG. 5B, at this time the terminals 2105 and 2105' are upside down, and the pushing force F1 is applied to install the entire terminal module 21 into the housing 20, and then the latch structure 22 is turned away from the third position, for example: turn to the first position as shown in FIG. 1B, to complete the polarity change of the optical connector 2.

Figure 6:
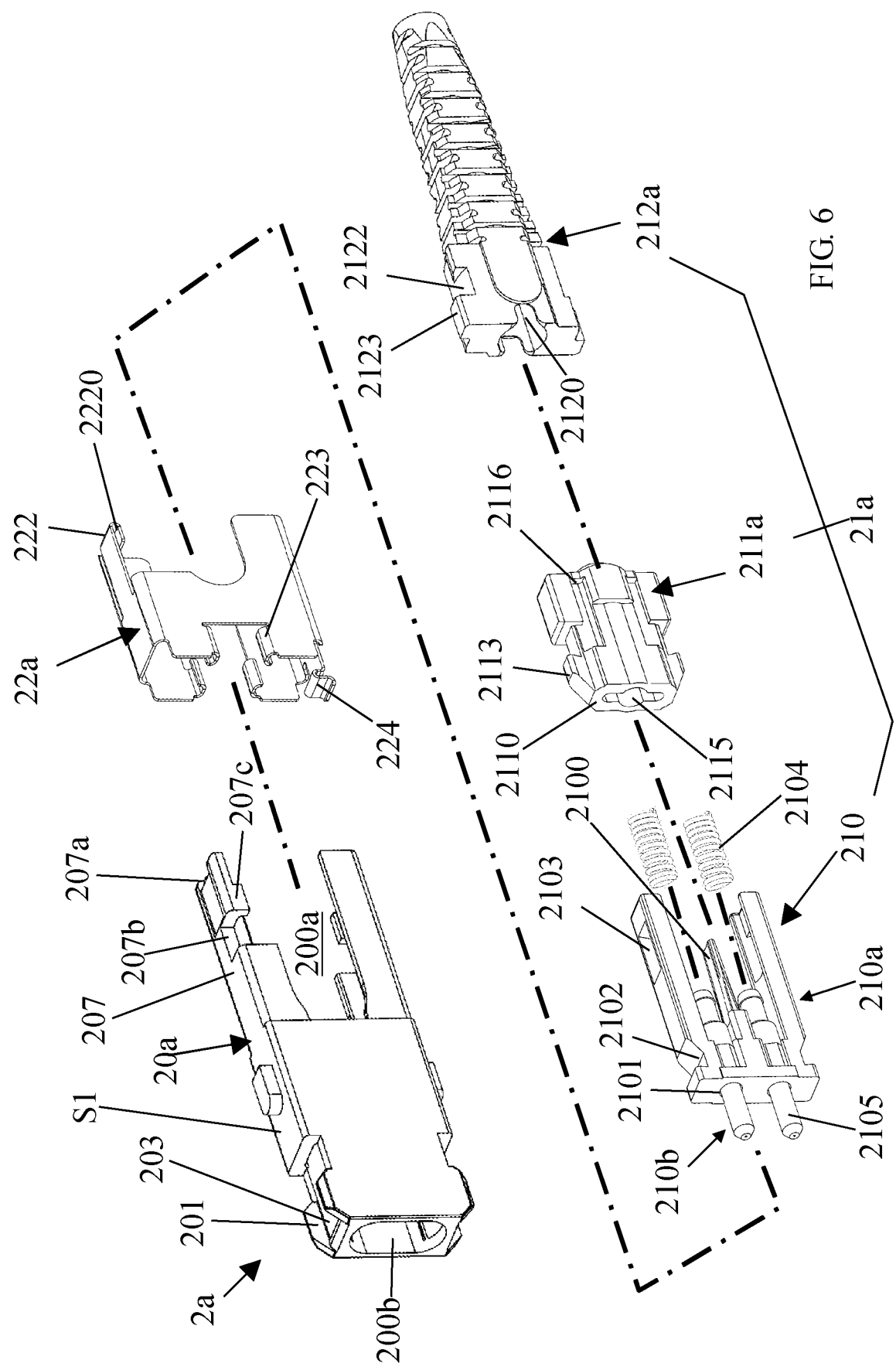
FIG. 6 is a three-dimensional exploded schematic diagram of another embodiment of the optical connector in the present invention.
Figure 7:
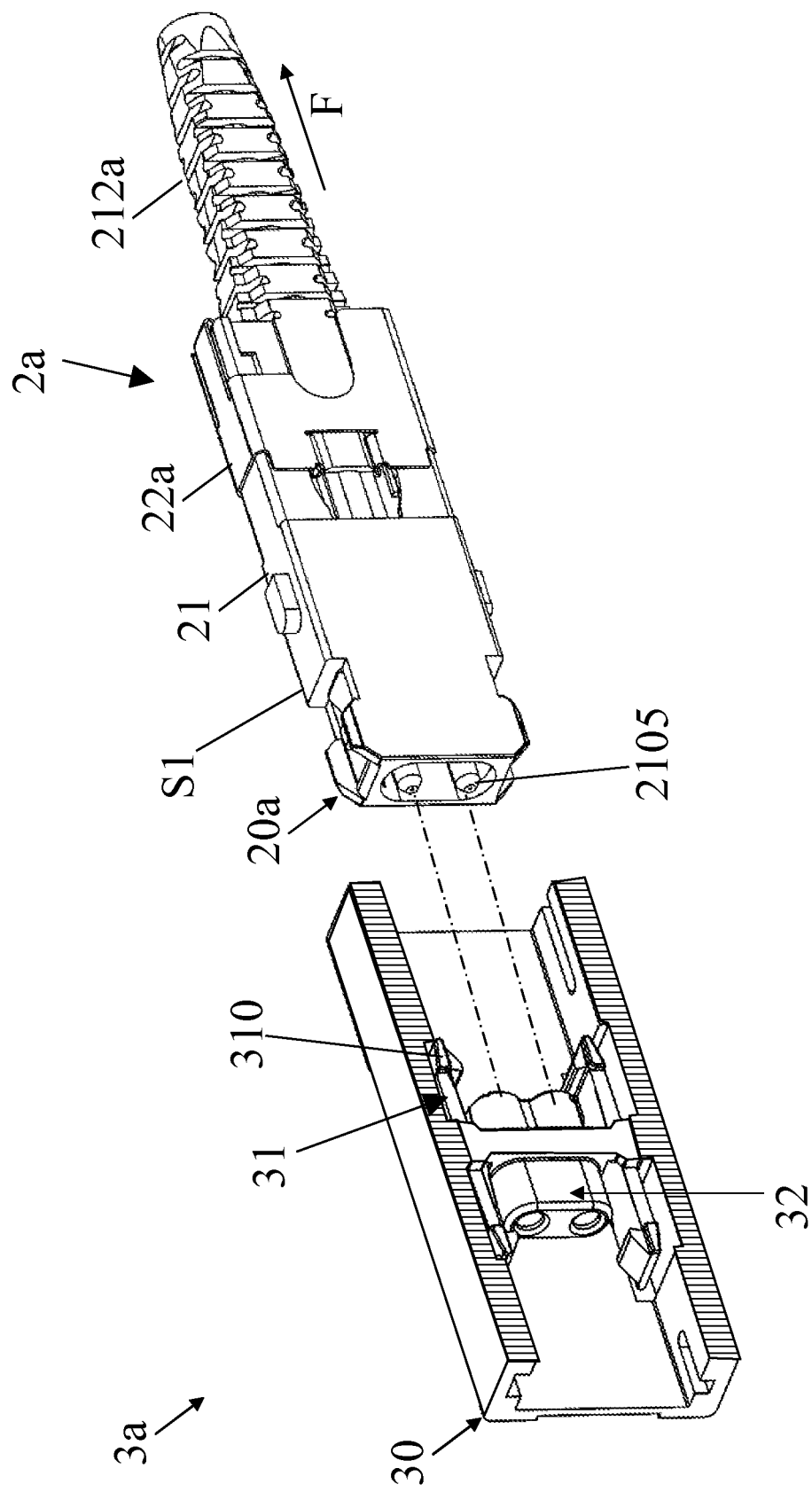
FIG. 7 is a schematic diagram of another embodiment of the optical connector module in the present invention.
Figure 8:
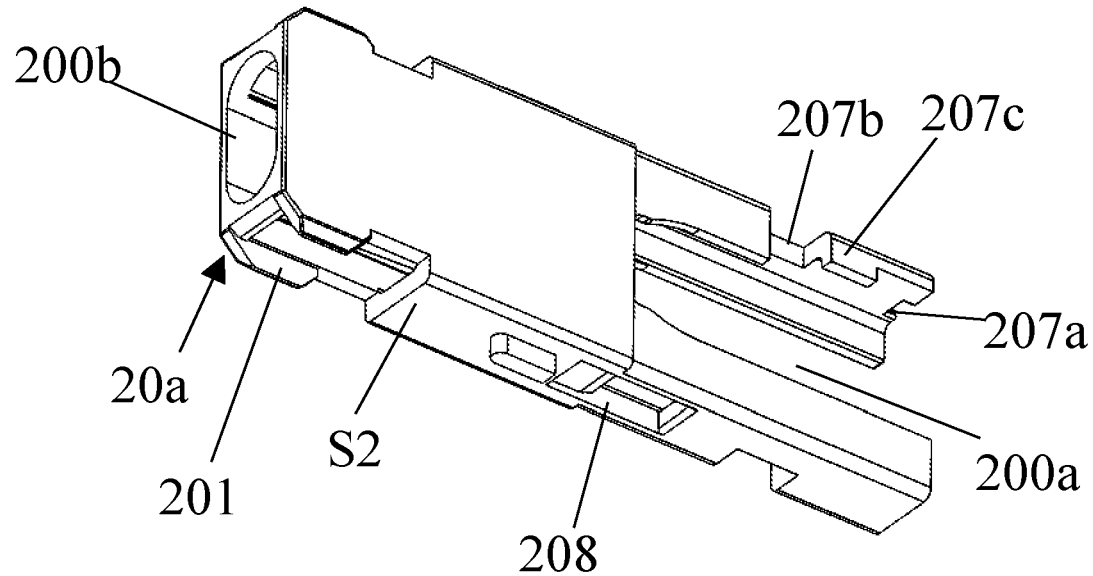
FIG. 8 is a schematic diagram of an embodiment of the outer housing from different angle of vision in the present invention.

Please refer to FIGS. 6 to 8, in which FIG. 6 is a three-dimensional exploded schematic diagram of another embodiment of the optical connector in the present invention, FIG. 7 is a schematic diagram of another embodiment of the optical connector module in the present invention, and FIG. 8 is a schematic diagram of an embodiment of the outer housing from different angle of vision. In this embodiment, the optical connector 2a is an SN optical connector, but it is not limited thereto. The optical connector module 3a includes an optical connector 2a and an optical receptacle 30, wherein the optical connector 2a is inserted into the optical receptacle 30 to be coupled to the optical receptacle 30. In this embodiment, the optical connector 2a includes an outer housing 20a, a coupling module 21a, and a latch structure 22a. In this embodiment, one end of the outer housing 20a has an insertion hole 200a, and another end of the outer housing 20a has a coupling hole 200b to communicate with the insertion hole 200a. The outer housing 20a has a housing rod 207 on the side of the insertion hole 200a, on which a second buckle structure 207a, a third positioning structure 207b, and a first positioning structure 207c are disposed. One end of the first lateral surface S1 of the outer housing 20a has an opening 203, and both sides of the opening 203 have unbuckle portions 201. Its purpose and function would be described later. The second lateral surface S2 of the outer housing 20a has a second stopping structure 208.

The coupling module 21a is installed in the outer housing 20a through the insertion hole 200a. In this embodiment, the coupling module 21a has a terminal module 210, a guiding structure 211a, and a boot structure 212a. The terminal module 210 has a terminal base 210a and a pair of terminal portions 210b, wherein the terminal base 210a is slidably disposed in the outer housing 20, and the center of the terminal base 210a has a partition plate 2100 for dividing the terminal base 210a into two areas to accommodate the terminal portions 210b respectively. At the front end of the terminal base 210a, the two sides of the partition plate 2100 have through holes 2101, and the upper and lower sides of the through holes 2101 respectively have buckle portions 2102. The upper and lower sides of the end of the partition plate 2100 have second buckle grooves 2103 respectively. The buckle portions 2102 are respectively exposed from the openings 203 on the upper and lower sides of the outer housing 20, and their functions would be described later. The terminal portion 210b further has a terminal 2105 and an elastic element 2104, wherein the terminal 2105 passes through the through hole 2101 at the front end of the terminal base 210a. One end of the elastic element 2104 is leaned against the end of the terminal 2105, and another end of the elastic element 2104 is leaned against the front end surface 2110 of the guiding structure 211a. The elastic element 2104 is used to provide elastic force to the terminal 2105 for adjusting the position of the terminal. The end of the terminal 2105 is coupled with a communication wire (not shown). In this embodiment, the communication wire is an optical fiber.

The terminal base 210a has a buckle portion 2102 at a position corresponding to the opening 203 of the outer housing 20a. When the coupling module 21a is installed in the outer housing 20a, the buckle portion 2102 is accommodated in the opening 203. In addition, a guiding structure 211a is disposed on another side of the terminal base 210a, and a first wire through hole 2115 is disposed inside the guiding structure 211a for guiding the communication wire coupled to the terminal 2105. Both sides of the front end surface 2110 of the guiding structure 211a have second positioning structures 2113, which are combined with the second buckle groove 2103 when the guiding structure 211a is combined with the terminal base 210a. It should be noted that, in another embodiment, the second buckle groove 2103 may also be changed to a convex structure, and the second positioning structure 2113 may also be changed to a groove structure, and the two can be combined with each other. Another end of the guiding structure 211a is coupled to the boot structure 212a. The guiding structure 211a further has a second braking structure 2116. In this embodiment, the second braking structure 2116 is a stopping surface structure, and its function would be described later. It should be noted that although in this embodiment, the terminal base 210a and the guide structure 211a are designed separately, in another embodiment, the terminal base 210a and the guide structure 211a may be an integrally formed structure.

The boot structure 212a is disposed on one side of the guiding structure 211a, and the boot structure 212a has a second wire through hole 2120, which penetrates the entire boot structure 212a. The second wire through hole 2120 corresponds to the first wire through hole 2115 for allowing communication wires to pass through. The boot structure 212a has a second positioning structure 2122 which is combined with the first positioning structure 207c when the coupling module 21a is installed in the outer housing 20a. In this embodiment, the first positioning structure 207c is a convex structure, and the second positioning structure 2122 is a groove structure, so that the two can be combined with each other. In another embodiment, the first positioning structure 207c may also be a groove structure, and the second positioning structure 2122 may be a convex structure, which may also be put into practice. In addition, when the coupling module 21a is installed inside the outer housing 20a, the fourth positioning structure 2123 at the front end of the boot structure 212a is also accommodated into the third positioning structure 207b, so that the boot structure 212a achieves a dual positioning effect by the combination of first positioning structure 207c and the second positioning structure 2122 and the combination of the fourth positioning structure 2123 and the third positioning structure 207b. It should be noted that the third positioning structure 207b in this embodiment is a groove structure, and the fourth positioning structure 2123 is a convex structure, but it is not limited thereto. For example: the third positioning structure 207b may be convex structure, and the fourth positioning structure 2123 may be a groove structure.

The latch structure 22a is slidably connected to the outer housing 20a. The latch structure 22a may achieve the integration of the outer housing 20a and the coupling module 21a by changing the sliding position, so that the outer housing 20a may not move relative to the coupling module 21a; or the restraint relationship between the outer housing 20a and the coupling module 21a may be released, so that the outer housing 20a may move relative to the coupling module 21a, wherein the outer housing 20a may lock the optical connector 2a in the optical receptacle 30, and the locking relationship is released by the coupling module 21a, which allows the optical connector 2a to be taken away from the optical receptacle 30. The latch structure 22a further has a first stopping structure 224. During the movement of the latch structure 22a, the first stopping structure 224 may be restrained to move within the second stopping structure 208 on the second lateral surface S2 of the outer housing 20a. In this embodiment, the first stopping structure 224 is a bent plate, which is connected to the latch structure 22a, and the second stopping structure 208 on the outer housing 20a is a sliding groove structure. In this embodiment, the first stopping structure 224 is a bent plate, which is connected to the latch structure 22a, and the second stopping structure 208 on the outer housing 20a is a sliding groove structure. When the first stopping structure 224 is located in the second stopping structure 208, the latch structure 22a restrains the boot structure 212a and prevents the boot structure 212a from separating from the outer housing 20a. When the first stopping structure 224 is forced to separate from the second stopping structure 208, the boot structure 212a is no longer restrained by the latch structure 22a, so that it may be taken away from the outer housing 20a. The detailed operation method would be described later.

Figure 10:
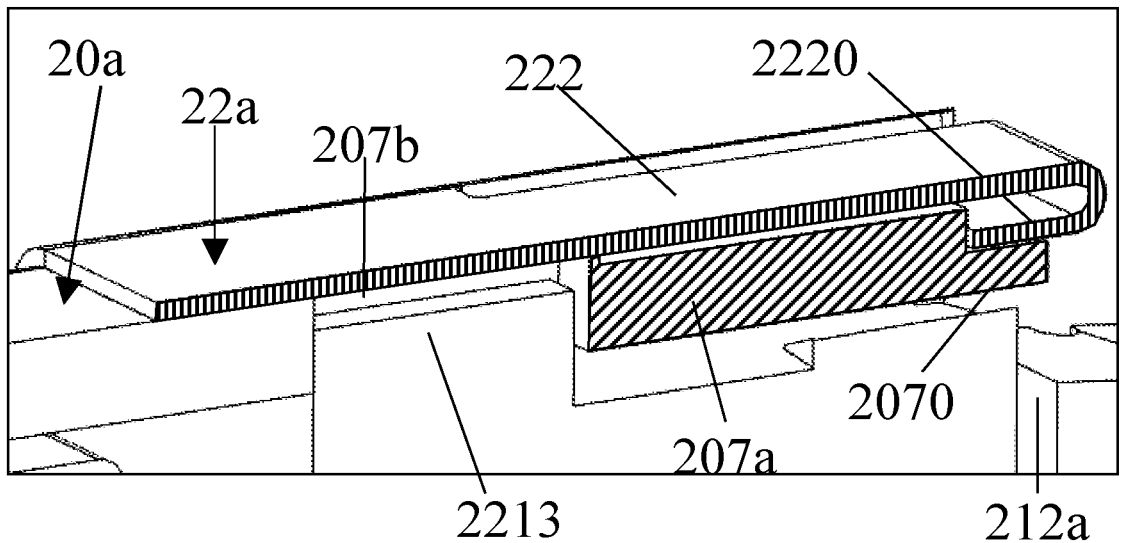
FIG. 10 is a partial cross-sectional schematic diagram of combining the outer housing and the sliding member in the present invention.
Figure 11:
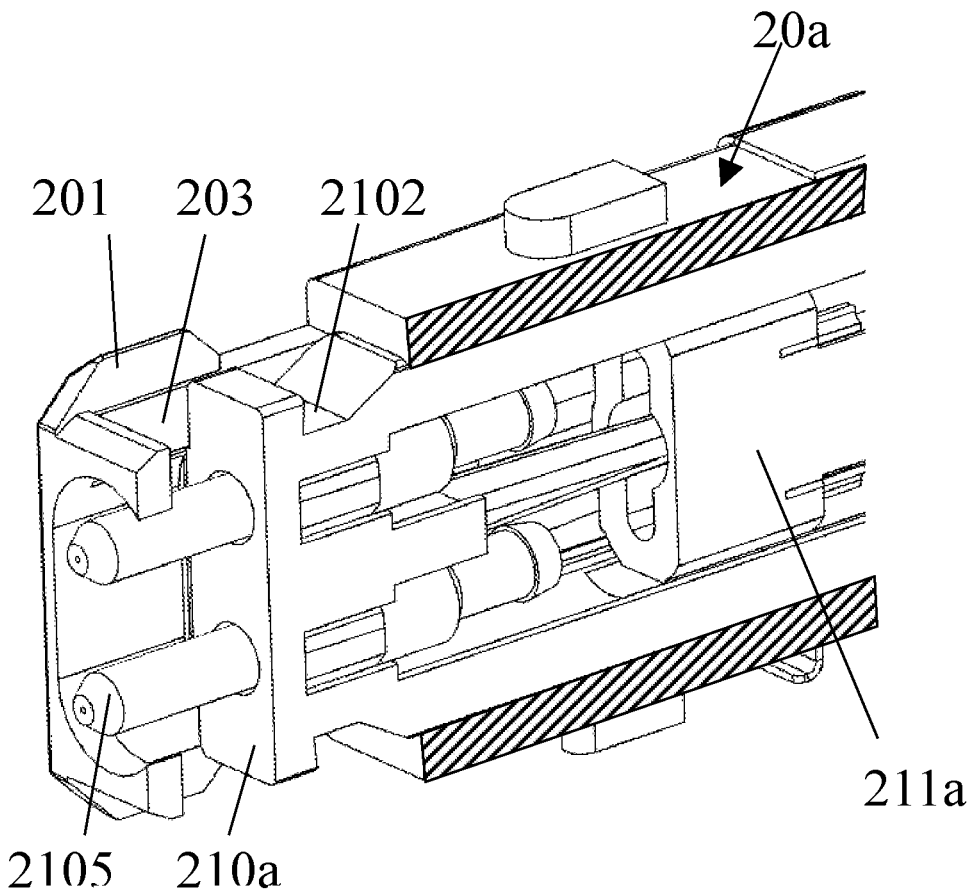
FIG. 11 is a cross-sectional schematic diagram of the front section of the optical connector in the present invention.

The latch structure 22a further has a first buckle structure 222 and a first braking structure 223. The first buckle structure 222 is used for buckling with the second buckle structure 207a on the outer housing 20a. In this embodiment, as shown in FIG. 10, which is a partial cross-sectional schematic diagram of combining the outer housing and the sliding member in the present invention. The first buckle structure 222 is an extending plate with a hook portion 2220 at its end, and the second buckle structure 207a is a structure that may be leaned by the hook portion 2220. In this embodiment, a recess portion 2070 at the end of the second buckle structure 207a is leaned against the hook portion 2220 at the end of the first buckle structure 222. It should be noted that the way in which the first buckle structure 222 and the second buckle structure 207a are buckled is not limited to the way shown in the FIG. 10, as long as the buckle relationship between the first buckle structure 222 and the second buckle structure 207a may be released, it may meet the spirit of the present invention. Therefore, the person having ordinary skill in the art may refer to the prior art to put it into practice in other ways. For example, the first buckle structure 222 is a convex structure, and the second buckle structure 207a is a groove structure. In the first state, the first buckle structure 222 is embedded into the second buckle structure 207a. In the second state, the user may pull the first buckle structure 222 apart from the second buckle structure 207a. Such mechanisms are known by those skilled in the art, and the detailed description is not repeated herein.

Figure 9:
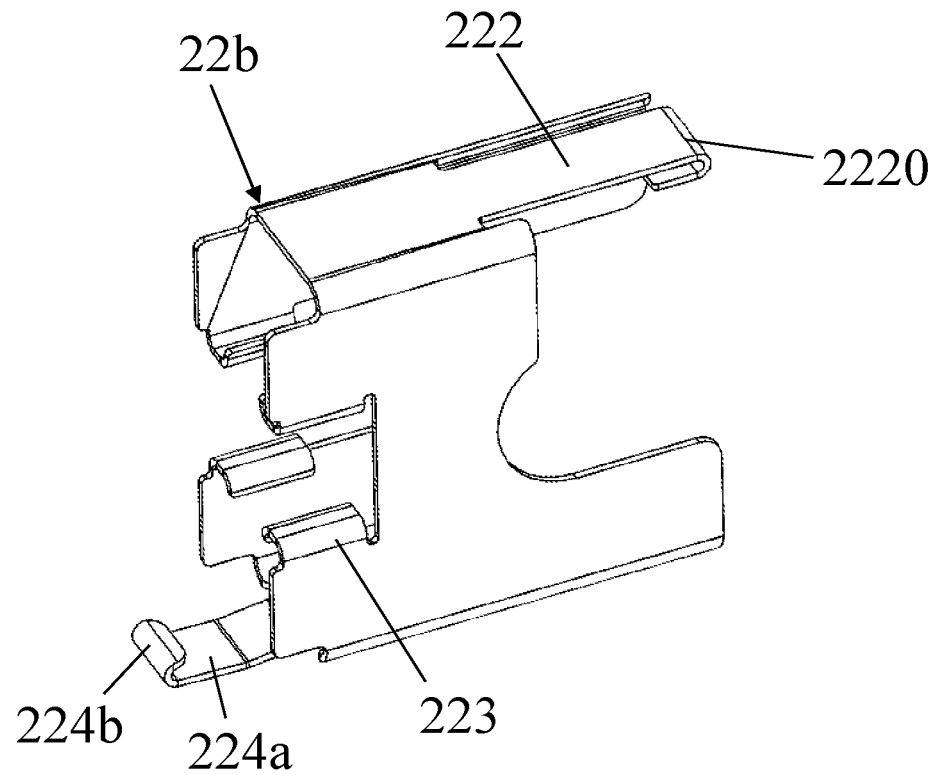
FIG. 9 is a three-dimensional schematic diagram of another embodiment of the latch structure in the present invention.

Please refer to FIG. 9, which is a three-dimensional schematic diagram of another embodiment of the latch structure in the present invention. In this embodiment, the design of the latch structure 22b is similar to the previous embodiment. The difference is that the first stopping structure 224a in this embodiment is not a bent plate, but is an extended pressing plate. One end of the first stopping structure 224a has an undercut structure 224b, which may achieve the same effect as the aforementioned first stopping structure 224 being a bent plate.

Returning to FIGS. 6-9, similar to the first embodiment, the position of the latch structure 22a or 22b in this embodiment may exhibit three functions. The first function is to lock the optical connector 2a in the optical receptacle 30, in this state, the optical connector 2a cannot be pulled out by the external force and taken away from the optical receptacle 30. The second function is to release the locking relationship between the optical connector 2a and the optical receptacle 30, and then the optical connector 2a can be unplugged from the optical receptacle 30. The third function is that the polarity of the coupling module 21a of the optical connector 2a is changed.

Figure 12A:
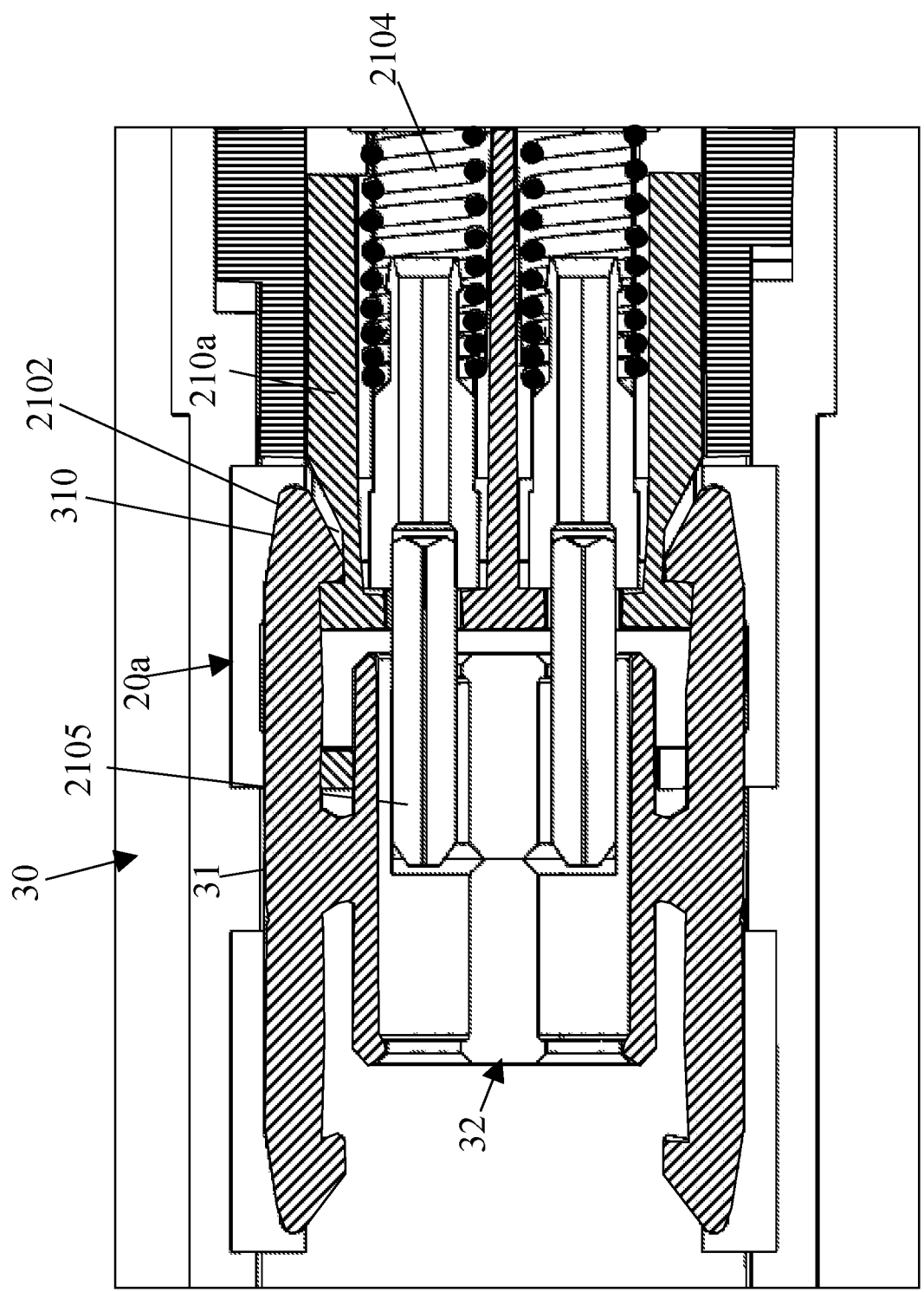
FIGS. 12A to 12C are schematic diagrams of locking the optical connector to the optical receptacle in the present invention.
Figure 12B:
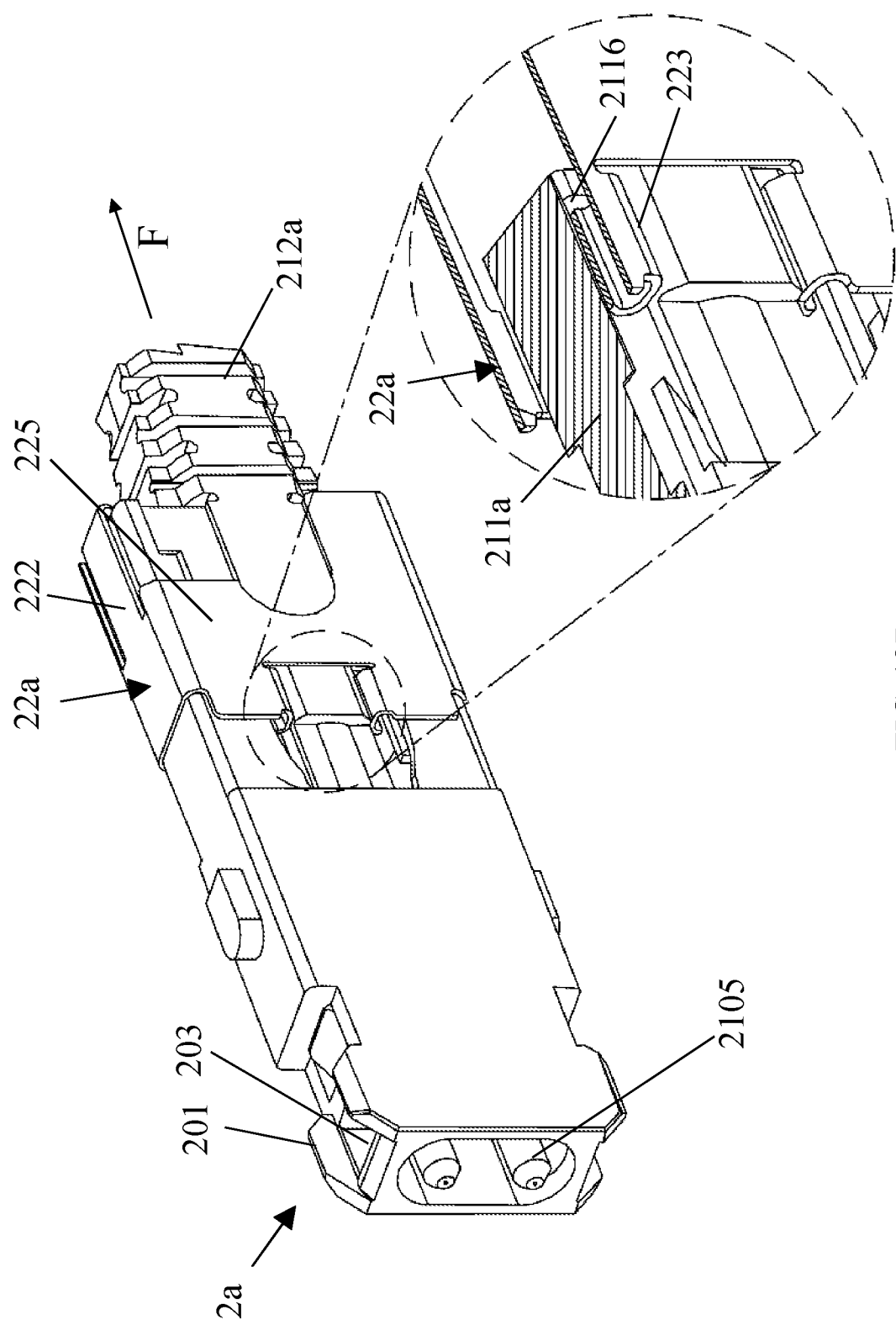
Figure 12C:
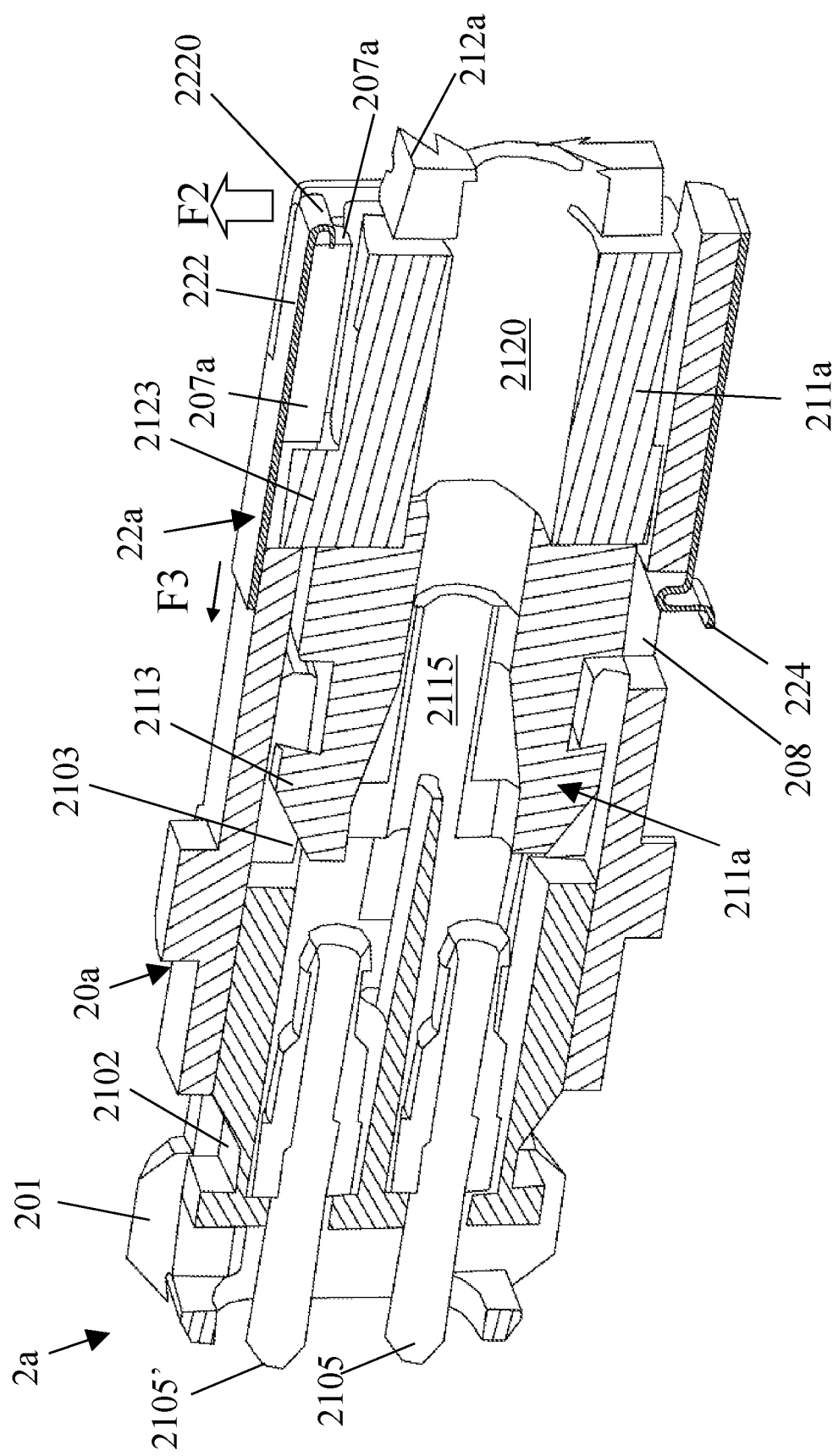

Next, how to achieve the above three functions is going to be explained. First, when the optical connector 2a of the present invention is pulled by the external force accidentally, the effect of not taking away from the optical receptacle 30 is achieved. Please refer to FIGS. 6-9 and FIGS. 11-12, FIG. 11 is a cross-sectional schematic diagram of the front section of the optical connector in the present invention, and FIGS. 12A to 12C are schematic diagrams of fixing the optical connector to the optical receptacle in the present invention. The optical connector 2a in this embodiment is combined with the optical receptacle 30. The optical receptacle 30 has a claw portion 31 and an electrical connection base 32, wherein the claw portion 31 is formed on both sides of the electrical connection base 32 respectively. When the optical connector 2a is inserted into the optical receptacle 30 and combined with the electrical connection base 32, the claw member 310 on the corresponding claw portion 31 in the optical receptacle 30 is slid into the corresponding buckle portion 2102 to fix the optical connector 2a. Although the claw member 310 is buckled with the buckle portion 2102, in this state, as long as the optical connector 2a is pulled by the external force, it would still be separated from the optical receptacle 30. Therefore, the latch structure 22a is slid to the first position to ensure that the optical connector 2a is locked in the optical receptacle 30.

As shown in FIGS. 10 to 12C, in the first position, that is, the first braking structure 223 of the latch structure 22a is leaned against the second braking structure 2116. In addition, the hook portion 2220 of the first buckle structure 222 is leaned against the recess portion 2070. In the meanwhile, the first stopping structure 224 is located on one side of the second stopping structure 208. Since one end of the first braking structure 223 is leaned against the second braking structure 2116 on the guide structure 211a, and the hook portion 2220 of the first buckle structure 222 and the recess portion 2070 are leaned against each other, when the boot structure 212a is pulled by the external force F, the force is delivered to the outer housing 20a through the boot structure 212a, and the second buckle structure 207a of the outer housing 20a is pulled to push the latch structure 22a in the direction of force.

The force generated by the external force F is delivered from the outer housing 20a to the latch structure 22a, and then from the first braking structure 223 of the latch structure 22a to the second braking structure 2116. Since the guiding structure 211a is combined with the terminal base 210a, and the terminal base 210a is held by the claw member 310 of the claw portion 31, the guiding structure 211a has a restraining effect on the latch structure 22a, making the latch structure 22a is locked in the original position and cannot be moved. The outer housing 20a cannot move along the direction of the external force F, so that the entire optical connector 2a cannot be pulled along the direction of the external force F, and is locked in the optical receptacle 30. Therefore, when the latch structure 22a is in the first position, the optical connector 2a cannot be pulled out of the optical receptacle 30 whether the user pulls the optical connector 2a intentionally or accidentally.

Figure 13A:
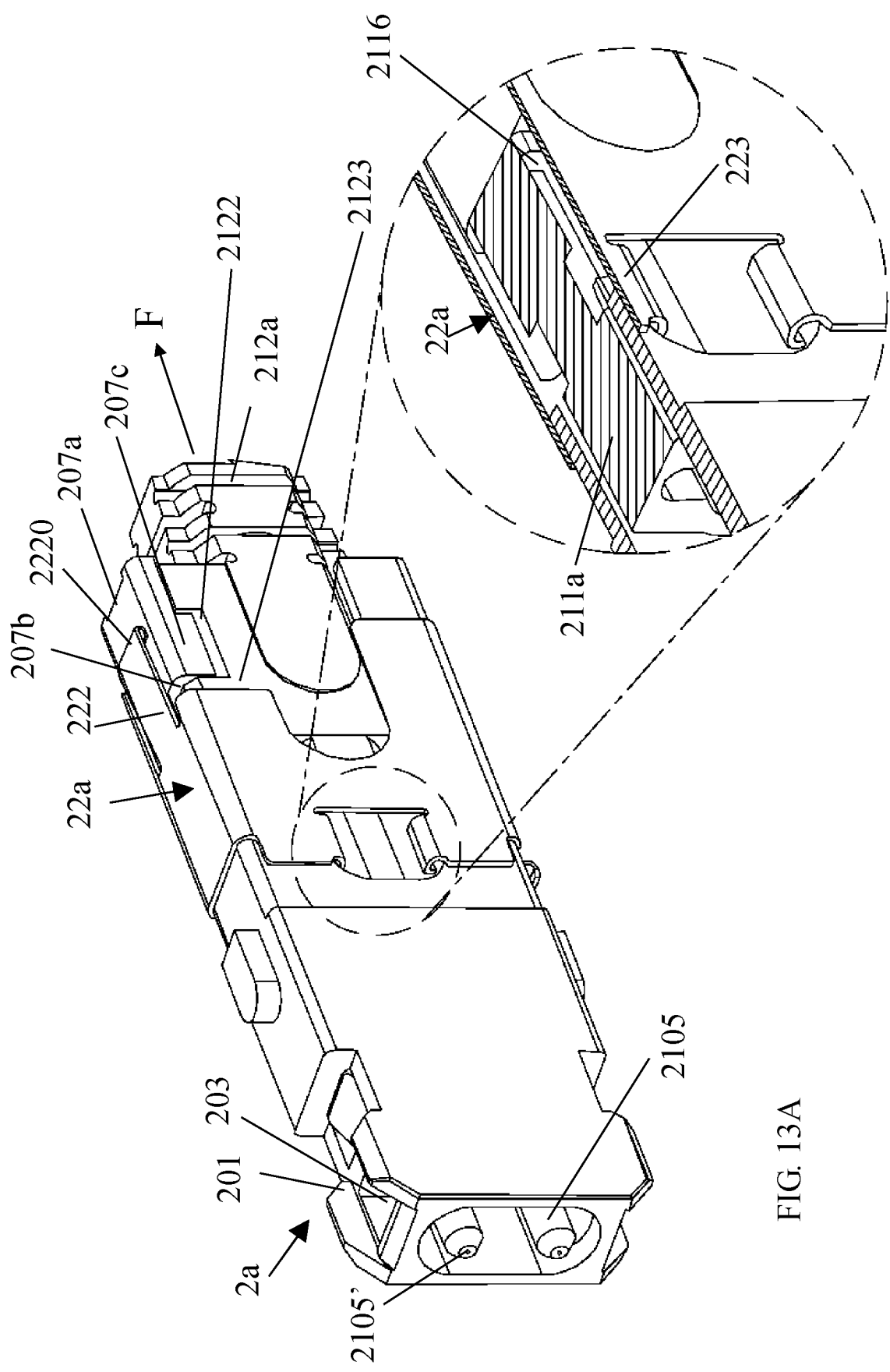
FIGS. 13A to 13C are schematic diagrams of unlocking and taking the optical connector away from the optical receptacle in the present invention.
Figure 13B:
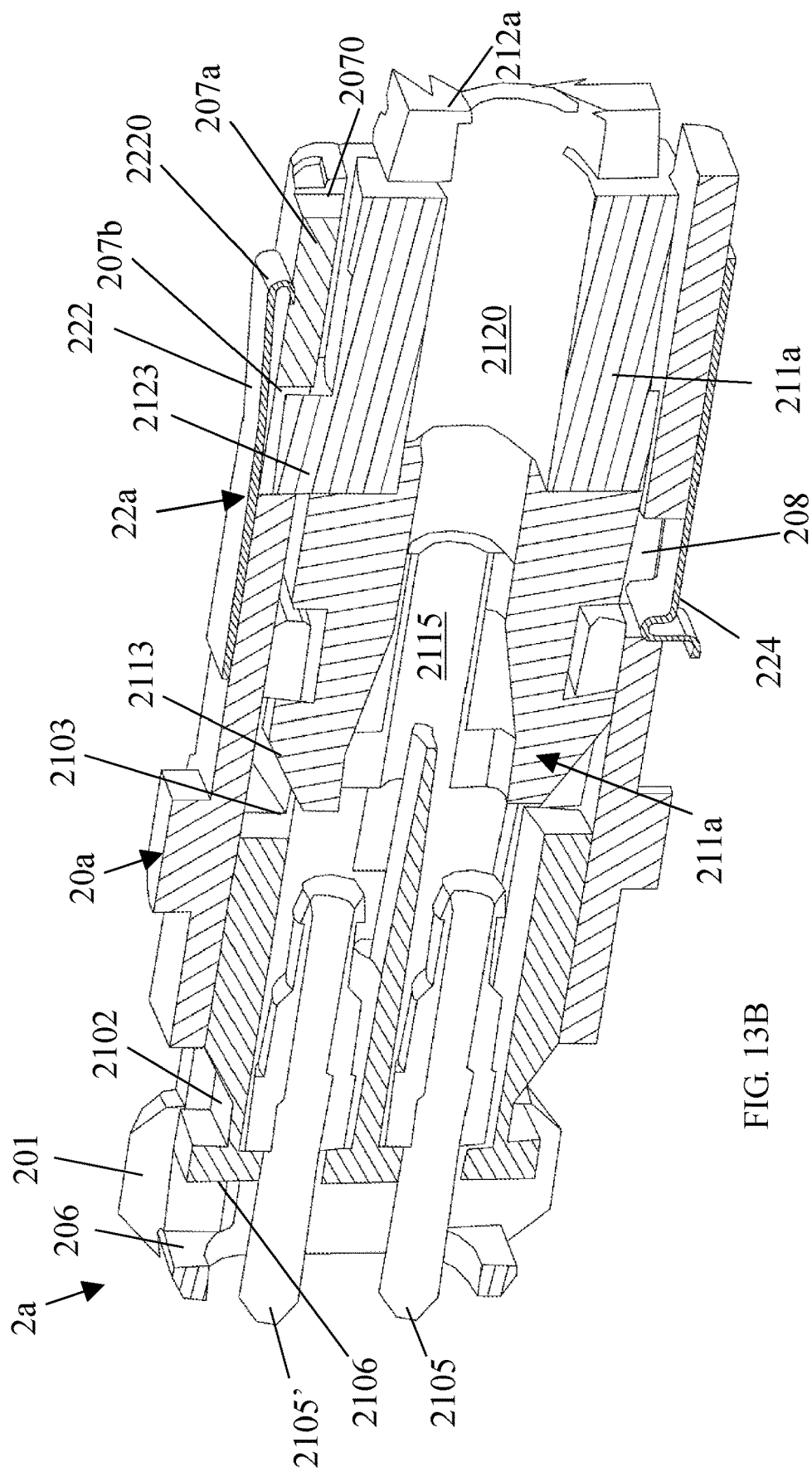
Figure 13C:
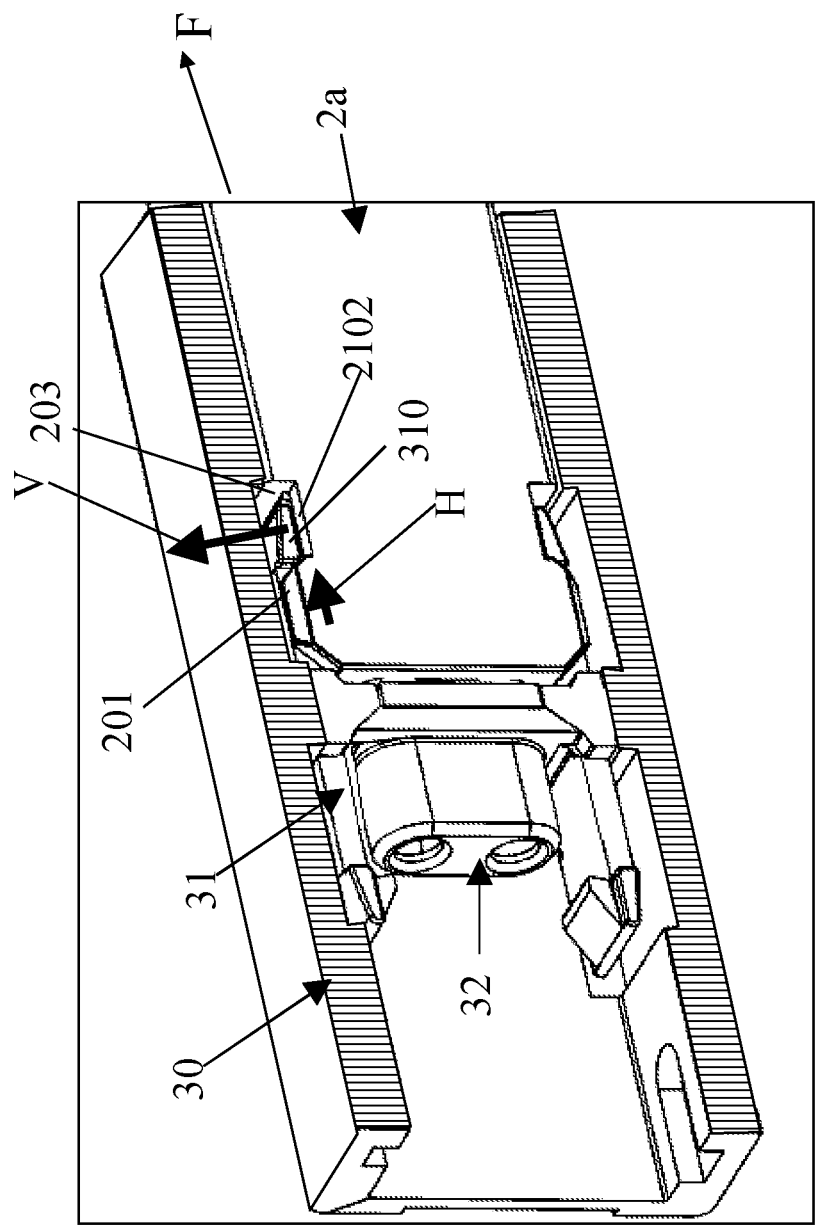

Please refer to FIGS. 13A to 13C, which are schematic diagrams of unlocking and taking the optical connector away from the optical receptacle in the present invention. If the user wants to pull the optical connector 2 out of the optical receptacle 30, the user can initially move the latch structure 22a to the second position as shown in FIG. 13A. The operation way may be in the state of FIG. 12C, an external force F2 is provided to move the hook portion 2220 of the first buckle structure 222 of the latch structure 22a, so that the hook portion 2220 of the first buckle structure 222 is taken away from the second buckle structure 207a. At this time, the latch structure 22a may be pushed by another external force F3 to move to the second position, as shown in FIG. 13A. When the latch structure 22a moves to the second position, as shown in FIG. 13B, the first stopping structure 224 slides to another side of the second stopping structure 208, and one end of the first braking structure 223 is no longer leaned against the second braking structure 2116 on the guiding structure 211a. When the boot structure 212a is pulled by the external force F, the force is delivered to the outer housing 20a, so that the optical connector 2a moves in the direction of the external force F and is taken away from the optical receptacle 30.

Please refer to FIGS. 13B and 13C, when the boot structure 212a is pulled by the external force, the fourth positioning structure 2123 on the boot structure 212a is leaned against a wall of the third positioning structure 207b, and the external force would be applied to the outer housing 20a. Since the latch structure 22a moves to the second position, the hook portion 2220 is not leaned against the second buckle structure 207a due to the change in position. Therefore, one end of the first braking structure 223 is no longer leaned against the second braking structure 2116 on the guiding structure 211a. In this state, the external force F applied on the boot structure 212a is delivered to the outer housing 20a, so that the outer housing 20a moves a predetermined distance H in the direction of the external force F. When the outer housing 20a moves, the unbuckle portion 201 also moves, and the claw portion 31 would be propped up in the direction V for a certain distance, so that the claw member 310 is separated from the buckle portion 2102. After the claw member 310 is separated from the buckle portion 2102, the outer housing 20a continues to move along the direction of the external force F, and the end portion 206 of the outer housing 20a would be leaned against the surface 2106 of the terminal base 210a after moving a certain distance. As the external force F continues to be applied, the outer housing 20a pushes the terminal base 210a to move in the direction of the external force, and finally the entire optical connector 2a is separated from the optical receptacle 30.

Next, how to change the polarity of the optical connector 2a of the present invention is going to be explained. The latch structure 22a of the present invention may not only control the insertion and removal of the optical connector 2a, but also control the polarity change of the optical connector 2a. As shown in FIG. 13B, the terminal 2105 is on the lower side and the terminal 2105' is on the upper side. The so-called polarity change is to reverse the position of the terminal up and down. In one embodiment, as shown in FIGS. 13A and 13B, when the latch structure 22a is slid to the second position, because the first stopping structure 224 is slid to another side of the second stopping structure 208, the lateral baffle 225 of the latch structure 22a blocks the fourth positioning structure 2123 of the boot structure 212a, so that the boot structure 212a may not be disassembled for polarity change in this state.

Figure 14A:
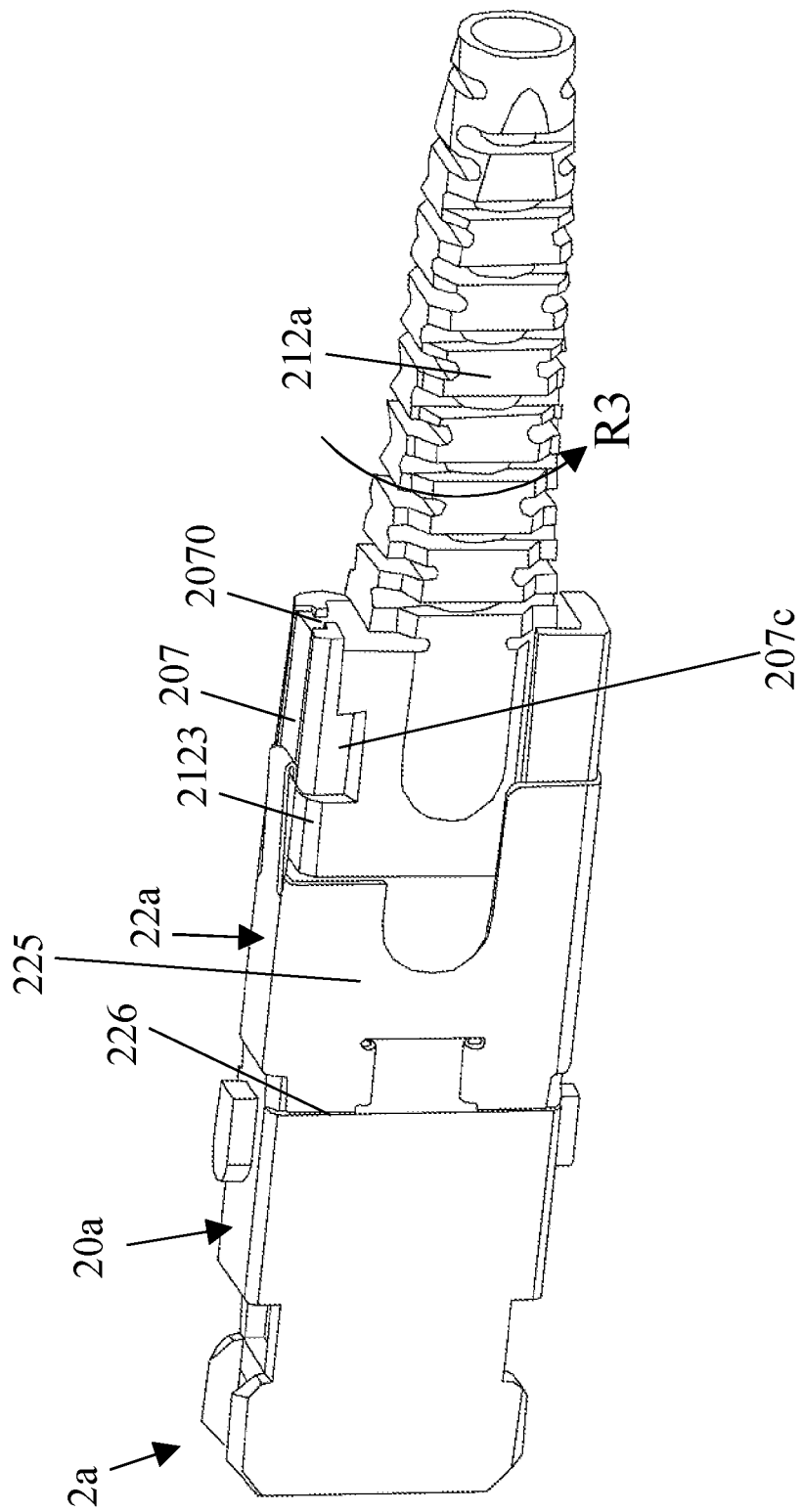
FIGS. 14A to 14C are schematic diagrams of the polarity change of the optical connector in the present invention.

As shown in FIG. 14A, when the user needs to change the polarity, the latch structure 22a may be slid to the third position. The moving way is that the user pulls the first stopping structure 224 so that the first stopping structure 224 is separated from the second stopping structure 208 and is no longer restrained in the second stopping structure 208. Once the first stopping structure 224 is separated from the second stopping structure 208, the latch structure 22a may continue to move and change from the state of FIG. 13A to the state of FIG. 14A. In this embodiment, the third position may be any position where the lateral baffle 225 of the latch structure 22a no longer covers the boot structure 212a and allows the boot structure 212a to rotate.

Figure 14B:
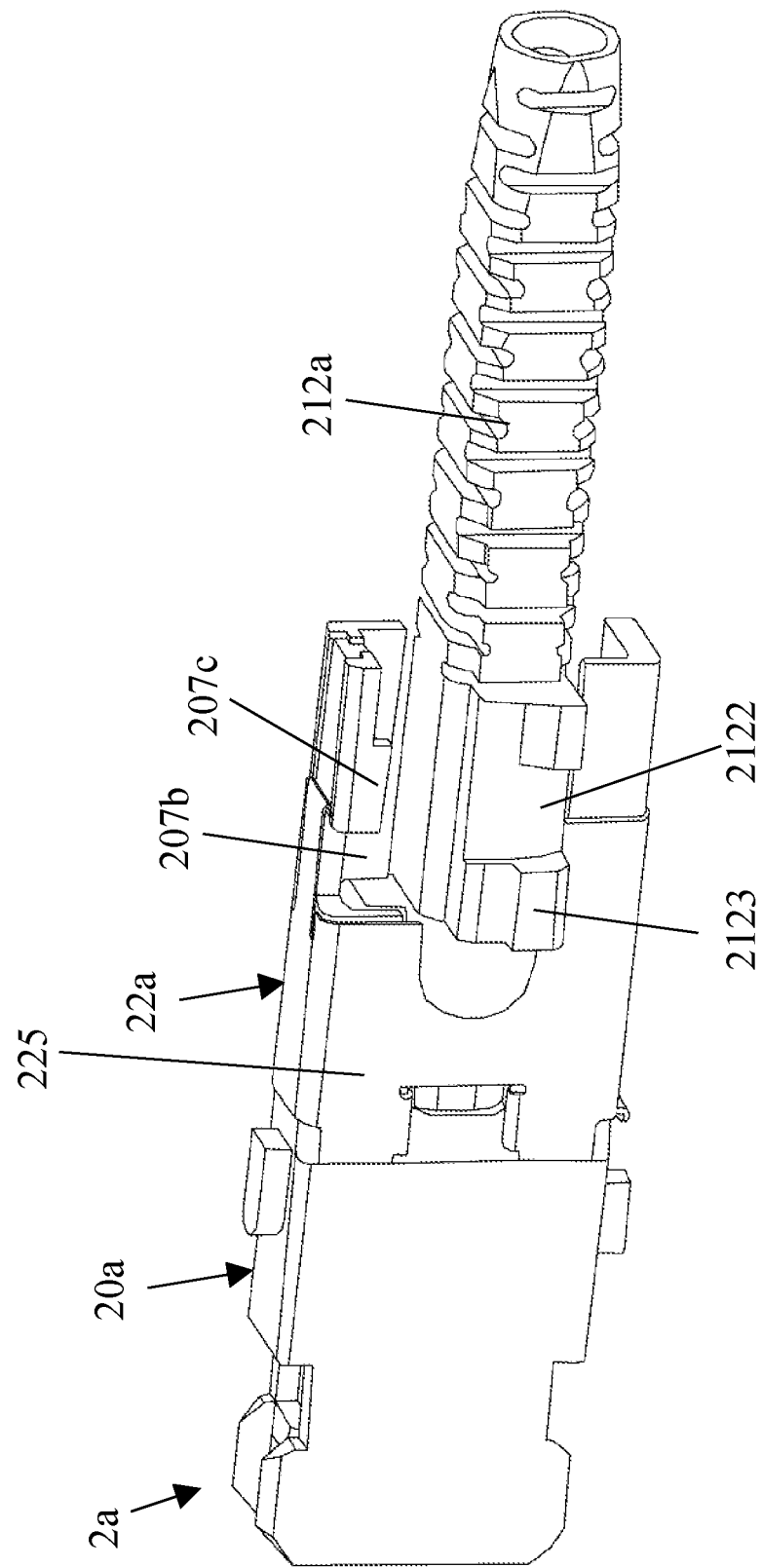
Figure 14C:
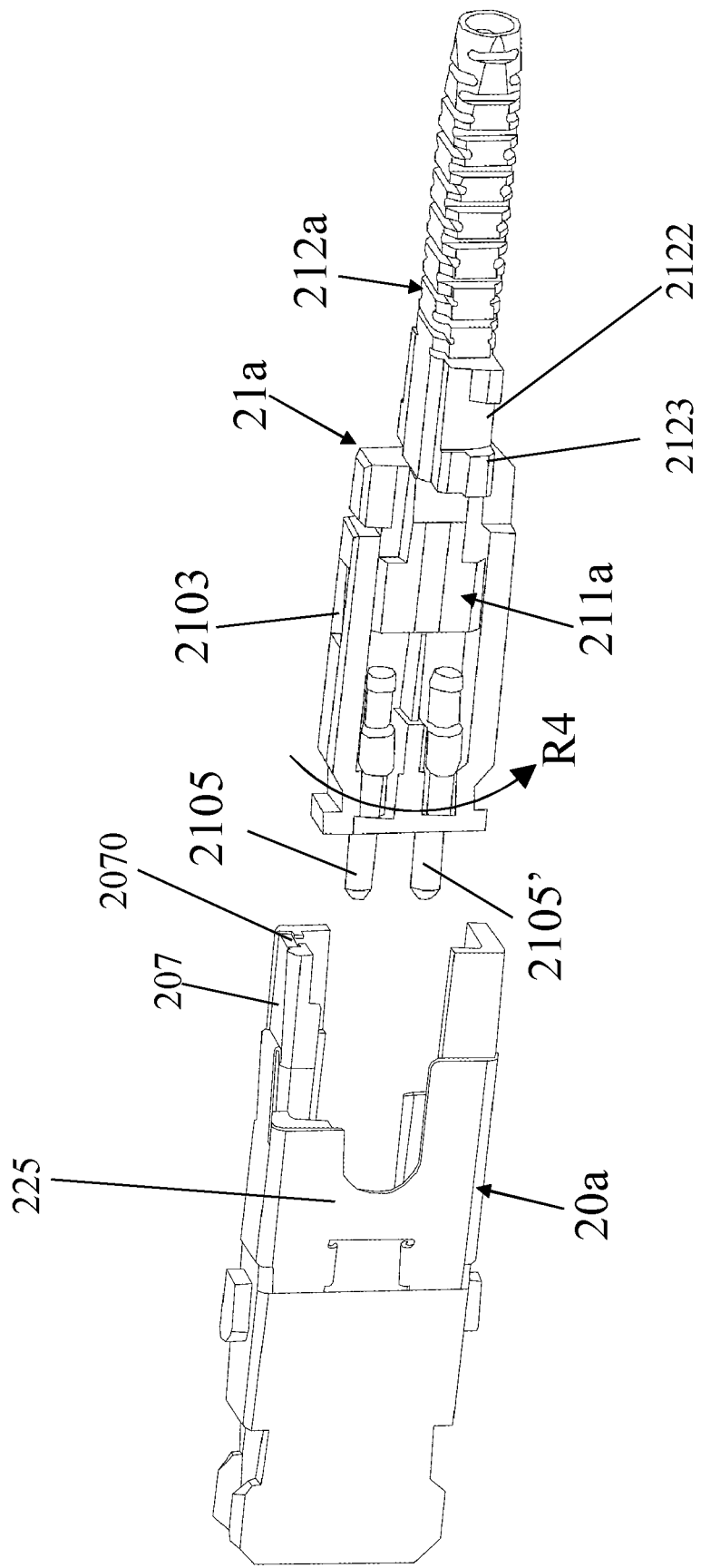

In the state of FIG. 14A, the fourth positioning structure 2123 at the front end of the boot structure 212a is no longer restrained by the lateral baffle 225 of the latch structure 22a. Therefore, the user can rotate the boot structure 212a with a rotating movement R3 to make it perform a rotating movement R1 (as shown in FIG. 3A), so that the boot structure 212a rotates 90 degrees to form the state shown in FIG. 14B. In the state of FIG. 14B, the boot structure 212a may be taken away to form the state of FIG. 14C. Once the boot structure 212a, the coupling module 21a (including the terminal base 210a, the terminal module 210b), and the guiding structure 211a are completely pulled out of the outer housing 20a, the user can rotate the terminal base 210a by performing a rotating movement R4 to turn it over 180 degrees. In this way, the terminals 2105 and 2105' are swapped up and down. After that, the terminal base 210a, the guiding structure 211a and the boot structure 212a are installed back into the outer housing 20a, and the latch structure 22a is slid to the first position or the second position. The boot structure 212a is restrained so that it may not rotate, that is, the polarity change is completed.

Figure 15:
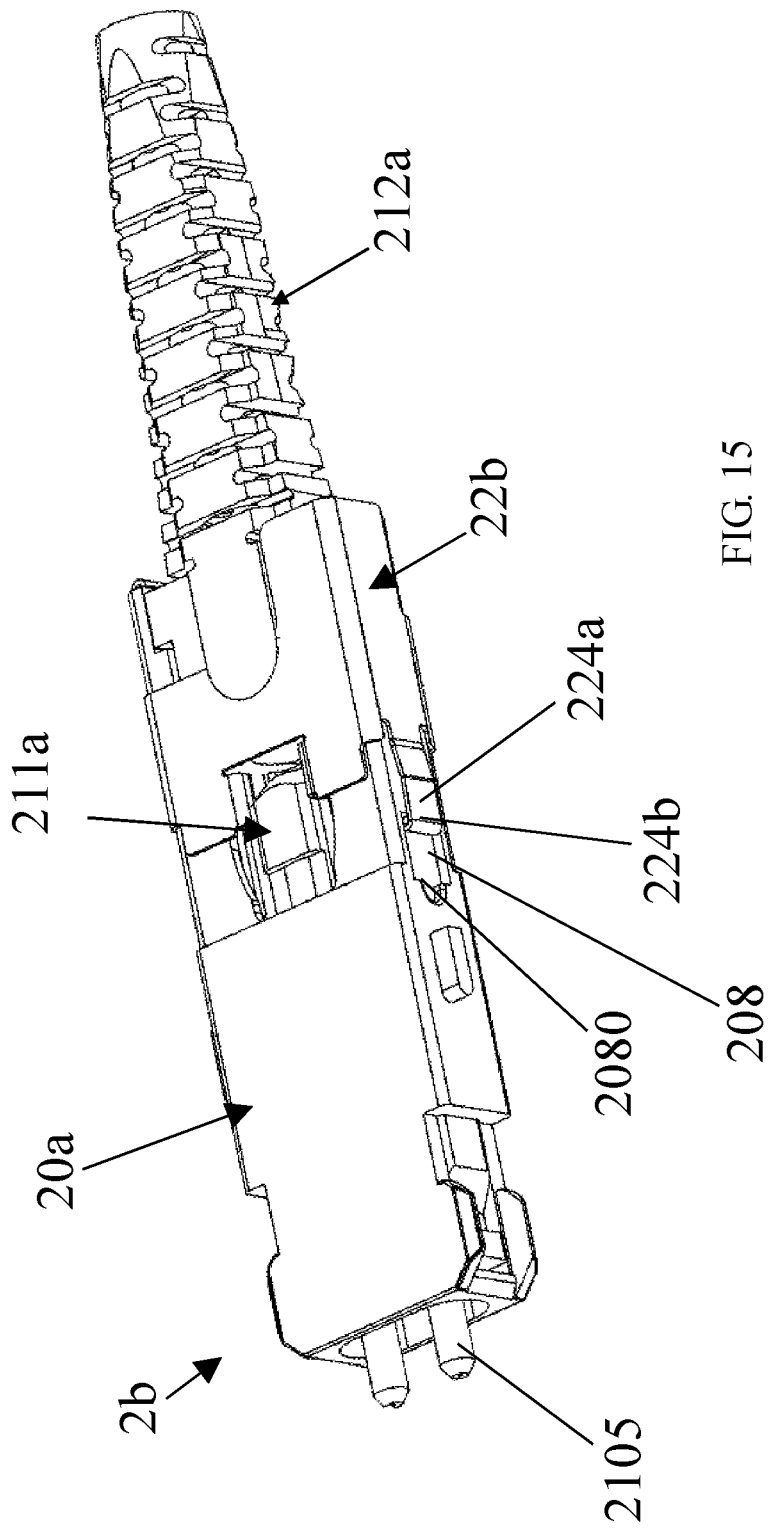
FIG. 15 is a three-dimensional schematic diagram of another embodiment of the optical connector in the present invention.

Please refer to FIG. 15, which is a three-dimensional schematic diagram of another embodiment of the optical connector in the present invention. The optical connector 2b of this embodiment is similar to the previous embodiment, the difference is that in this embodiment, the structure of the latch structure 22b has some differences. The first stopping structure 224a of the latch structure 22b is an extended pressing plate, and one end of the extended pressing plate has an undercut structure 224b. The first stopping structure 224a also has three positions, as shown in this embodiment, it is the first position, that is, the first stopping structure 224a is accommodated in the second stopping structure 208. In this state, the optical connector 2b may not be taken away from the optical receptacle. When the latch structure 22b moves to the second position, that is, one end of the undercut structure 224b is leaned against an end surface 2080 on one side of the second stopping structure 208, and the optical connector 2b is unlocked at this time, so that the optical connector 2b may be taken away from the optical receptacle. As for the unlocking way as mentioned above, it would not be repeated here. As for the polarity change, the undercut structure 224b of the latch structure 22b is pulled away from the trough of the second stopping structure 208 to make the latch structure 22b slides until the boot structure 212a rotates. The other parts are as mentioned above, and it's not repeated herein. It should be noted that the undercut structure 224b in this embodiment or the first stopping structure 224 shown in FIG. 6 is a bent plate, which is not the only one design. As long as the first stopping structure and the second stopping structure of locking structure used for positioning can be put into practice at the first position, second position and third position, this type of structure is well known to those skilled in the art, and it would not be repeated herein.

Based on the foregoing embodiments of the optical connector and the optical receptacle, in another embodiment, the present invention further provides an operation method of the optical connector module, which includes the following steps. First, as shown the optical connector 2 or 2a respectively in in FIGS. 1A, 1B or FIG. 6, the optical connector module includes an outer housing 20 or 20a, a coupling module 21 or 21a, and a latch structure 22 or 22a. As shown in FIGS. 2A and 2B, the optical connector 2 or 2a is inserted into the optical receptacle 30, so that the claw member 310 in the optical receptacle 30 is buckled with the coupling module 21 or 21a of the optical connector 2 or 2a. After that, when the latch structure 22 or 22a is moved to the first position by the first displacement movement, the optical connector 2 or 2a may not be taken away from the optical receptacle 30. The main purpose of this step is to ensure that the optical connector 2 or 2a would not be erroneously pulled out of the optical receptacle 30. The first displacement movement may be the rotation mode of the optical connector 2 in the aforementioned first embodiment or the sliding movement mode of the optical connector 2a in the aforementioned second embodiment.

When the user needs to pull the optical connector out from the optical receptacle, the latch structure 22 or 22a may be moved to the second position by the second displacement movement, and the outer housing 20 or 20a is slid relative to the coupling module 21 or 21a under an external force, so that the unbuckle portion 201 of the outer housing 20 or 20a moves with the external force, thereby releasing the claw member 310 from the coupling module 21. As a result, the optical connector 2 or 2a is pulled out from the optical receptacle (as shown in FIG. 3C or FIG. 13C). The second displacement movement may be the rotation mode of the optical connector 2 in the aforementioned first embodiment or the sliding movement mode of the optical connector 2a in the aforementioned second embodiment. Finally, if the polarity is to be changed, the latch structure 22 or 22a may be further controlled to move to the third position through rotation or sliding movement (as shown in FIG. 4B or FIG. 14B), then the polarity of the coupling module 21 or 21a is changed, which is as mentioned before, would not be repeated here.

In summary, the optical connector of the present invention has a latch structure that may be positioned at different positions, and the unlocking or locking state between the optical connector and the optical receptacle may be changed according to the position of the latch structure. The advantage of the present invention is to avoid the optical connector from being pulled off by the external force accidentally or intentionally, and achieve the effect of fixing the optical connector.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. An optical connector for coupling to an optical receptacle, comprising:
   an outer housing;
   a coupling module, disposed in the outer housing and slidably connected to the outer housing, and having a boot structure; and
   a latch structure, rotatably connected to the coupling module or slidably covered with the outer housing, wherein when the latch structure is located at a first position, the optical connector is not able to be taken away from the optical receptacle; and when the latch structure is located at a second position, the boot structure is rotated and the outer housing is slid relative to the coupling module whereby the optical connector is taken away from the optical receptacle.

2. The optical connector of claim 1, wherein the latch structure comprises a first stopping structure, a second stopping structure is disposed on a side of the outer housing to limit a movement of the first stopping structure within a range; when the latch structure is located at the first position, the first stopping structure is leaned against a first side of the second stopping structure to restrain the outer housing; when the latch structure is at the second position, the first stopping structure is separated from the first side of the second stopping structure to release the outer housing, so that the outer housing is taken away from the optical receptacle by an external force, thereby driving the coupling module separate from the optical receptacle.

3. The optical connector of claim 2, wherein the coupling module comprises:
   a terminal module, slidably connected to the outer housing, and configured for coupling to the optical receptacle;
   a guiding structure, connected to the terminal module; and
   the boot structure, connected to the guiding structure.

4. The optical connector of claim 3, wherein the outer housing has a first positioning structure, and the boot structure has a second positioning structure, which is combined with a first positioning structure when the boot structure is installed in the outer housing.

5. The optical connector of claim 4, wherein when the first stopping structure is separated from the second stopping structure, the latch structure is slid to a third position, so that the boot structure is not restrained by the latch structure, and the boot structure is separated from the outer housing by rotating in a predetermined angle.

6. The optical connector of claim 3, wherein the first stopping structure is a bent plate and is connected to the latch structure, and the second stopping structure is a sliding groove structure; when the bent plate is located in the sliding groove structure, the latch structure restrains the boot structure; when the bending plate is forced to separate from the sliding groove structure, the boot structure is taken away from the outer housing.

7. The optical connector of claim 3, wherein the first stopping structure is an extended pressing plate and is connected to the latch structure, the second stopping structure is a sliding groove structure; when the extended pressing plate is located in the sliding groove structure, the latch structure restrains the boot structure; when the extended pressing plate is forced to separate from the sliding groove structure, the boot structure is taken away from the outer housing.

8. The optical connector of claim 1, wherein the latch structure comprises:
   a first buckle structure, configured for buckling with a second buckle structure of the outer housing; and
   a first braking structure, the boot structure leaned against a second braking structure on the coupling module by an external force, and restrained the outer housing from moving along a direction away from the optical receptacle.

9. The optical connector of claim 1, wherein the coupling module comprises:
   a terminal module, slidably connected to the outer housing and configured for coupling to the optical receptacle;
   a guiding structure, connected to the terminal module having an extending shaft;
   the boot structure, rotatably connected to the extending shaft; and
   wherein when the latch structure is moved to the first position by a rotating movement, the guiding structure and the outer housing are moved by an external force, and when the latch structure is moved to the second position by the rotating movement, the outer housing is moved relative to the terminal module by the external force.

10. The optical connector of claim 9, wherein the latch structure comprises:
    a first fastener, wherein when the first fastener is located at the first position, the first fastener is buckled between the guiding structure and the outer housing to make the outer housing not move relative to the terminal module; when the first fastener is located at the second position, the first fastener is separated from a position between the guiding structure and the outer housing to cause the outer housing move relative to the terminal module by the external force;
    a connecting member, connected to the first fastener; and
    a second fastener, connected to the connecting member, the first fastener and the second fastener located at two ends of the connecting member, and the second fastener connected to the boot structure.

11. The optical connector of claim 10, wherein the outer housing has an escape groove, the latch structure rotates the first fastener to a position corresponding to the guiding groove by the rotating movement, so that the coupling module is separated from the outer housing.

12. An optical connector module, comprising:
an optical receptacle, having a claw member;
an optical connector, coupled to the optical receptacle, and buckled with the claw member, the optical connector including an outer housing, a coupling module, and a latch structure rotatably connected to the coupling module or slidably covered with the outer housing, a unbuckle portion of the outer housing located in the claw member, the coupling module disposed in and slidably connected to the outer housing, and the claw member buckled on the coupling module, wherein when the latch structure is located at a first position, the outer housing and the optical module are moved together, so that the optical connector is unable to take away from the optical receptacle; and when the latch structure is located at a second position, the boot structure is rotated and the outer housing is moved relative to the coupling module by an external force, so that the unbuckle portion of the outer housing is moved with the external force, thereby releasing the claw member from the coupling module and making the optical connector taken away from the optical receptacle.

13. The optical connector module of claim 12, wherein the latch structure comprises a first stopping structure, a second stopping structure is disposed on a side of the outer housing to limit a movement of the first stopping structure within a range; when the latch structure is slid to the first position, the first stopping structure is leaned against a first side of the second stopping structure to restrain the outer housing; when the latch structure is slid to the second position, the first stopping structure is separated from the first side of the second stopping structure to release the outer housing, the outer housing is moved by the external force, and the unbuckle portion is driven to prop up the claw member, so that the optical connector is taken away from the optical receptacle.

14. The optical connector module of claim 12,
wherein the coupling module comprises:
a terminal module, slidably connected to the outer housing, and configured for coupling to the optical receptacle;
a guiding structure, connected to the terminal module; and
the boot structure, connected to the guiding structure.

15. The optical connector module of claim 14, wherein the outer housing has a first positioning structure, and the boot structure has a second positioning structure, which is combined with the first positioning structure when the boot structure is installed in the outer housing.

16. The optical connector module of claim 15, wherein first stopping structure is separated from the second stopping structure, the latch structure is slid to a third position, so that the boot structure is not restrained by the latch structure, and the boot structure is separated from the outer housing by rotating in a predetermined angle.

17. The optical connector module of claim 14, wherein the first stopping structure is a bent plate and is connected to the latch structure, and the second stopping structure is a sliding groove structure; when the bent plate is located in the sliding groove structure, the latch structure restrains the boot structure; when the bending plate is forced to separate from the sliding groove structure, the boot structure is taken away from the outer housing.

18. The optical connector module of claim 14, wherein the first stopping structure is an extended pressing plate and is connected to the latch structure, the second stopping structure is a sliding groove structure; when the extended pressing plate is located in the sliding groove structure, the latch structure restrains the boot structure; when the extended pressing plate is forced to separate from the sliding groove structure, the boot structure is taken away from the outer housing.

19. The optical connector module of claim 12,
wherein the latch structure comprises:
a first buckle structure, configured for buckling with a second buckle structure of the outer housing; and
a first braking structure, the boot structure leaned against a second braking structure on the coupling module by the external force, and restrained the outer housing from moving along a direction away from the optical receptacle.

20. The optical connector module of claim 12, wherein the coupling module comprises:
a terminal module, slidably connected to the outer housing and configured for coupling to the optical receptacle;
a guiding structure, connected to the terminal module having an extending shaft;
the boot structure, rotatably connected to the extending shaft; and
wherein when the latch structure is moved to the first position by a rotating movement,
the guiding structure and the outer housing are moved by the external force, and
when the latch structure is moved to the second position by the rotating movement,
the outer housing is moved relative to the terminal module by the external force.

21. The optical connector module of claim 20, wherein the latch structure comprises:
a first fastener, wherein when the first fastener is located at the first position, the first fastener is buckled between the guiding structure and the outer housing to make the outer housing move relative to the terminal module; when the first fastener is located at the second position, the first fastener is separated from a position between the guiding structure and the outer housing to cause the outer housing move relative to the terminal module by the external force;
a connecting member, connected to the first fastener; and
a second fastener, connected to the connecting member, the first fastener and the second fastener located at two ends of the connecting member, and the second fastener connected to the boot structure.

22. The optical connector module of claim 12, wherein the outer housing has an escape groove, the latch structure rotates the first fastener to a position corresponding to the guiding groove by the rotating movement, so that the coupling module is separated from the outer housing.

23. An operation method of an optical connector module, comprising:
providing an optical connector, including an outer housing, a coupling module, and a latch structure;
inserting an optical connector into an optical receptacle to make a claw member, which is disposed in the optical receptacle, buckle with the coupling module of the optical connector;

moving the latch structure to a first position by a first displacement movement to make the optical connector not taken away from the optical receptacle; and moving the latch structure to a second position by a second displacement movement, rotating the boot structure and sliding the outer housing relative to the coupling module under an external force to make a unbuckle portion of the outer housing move with the external force, thereby releasing the claw member from the coupling module and taking the optical connector away from the optical receptacle, wherein the latch structure is rotatably connected to the coupling module or slidably covered with the outer housing.

24. The operation method of claim 23, wherein the first displacement movement and the second displacement movement are a sliding movement or a rotating movement.

25. The operation method of claim 23, comprising separating the coupling module from the outer housing by a rotating movement.

* * * * *